(12) United States Patent
Nakamura et al.

(10) Patent No.: US 8,993,973 B2
(45) Date of Patent: Mar. 31, 2015

(54) PIXEL-TYPE TWO-DIMENSIONAL IMAGE DETECTOR

(75) Inventors: Tatsuya Nakamura, Tokai (JP); Masaki Katagiri, Tokai (JP); Noriaki Tsutsui, Ogano (JP)

(73) Assignees: Japan Atomic Energy Agency, Ibaraki (JP); Chichibu Fuji Co., Ltd., Saitama (JP)

( * ) Notice: Subject to any disclaimer, the term of this patent is extended or adjusted under 35 U.S.C. 154(b) by 377 days.

(21) Appl. No.: 13/520,451

(22) PCT Filed: Jan. 4, 2011

(86) PCT No.: PCT/JP2011/050231
§ 371 (c)(1),
(2), (4) Date: Jul. 3, 2012

(87) PCT Pub. No.: WO2011/083868
PCT Pub. Date: Jul. 14, 2011

(65) Prior Publication Data
US 2012/0280132 A1 Nov. 8, 2012

(30) Foreign Application Priority Data
Jan. 8, 2010 (JP) .................................. 2010-003182

(51) Int. Cl.
*G01T 1/20* (2006.01)
*G01T 3/06* (2006.01)

(52) U.S. Cl.
CPC .... *G01T 3/06* (2013.01); *G01T 1/20* (2013.01)
USPC ........................................................ 250/368

(58) Field of Classification Search
CPC ................................... G01T 3/06; G01T 1/20
USPC ....................................................... 250/368
See application file for complete search history.

(56) References Cited

U.S. PATENT DOCUMENTS

2002/0121604 A1* 9/2002 Katagiri ......................... 250/368
2004/0115826 A1* 6/2004 Budach et al. ................. 436/172

FOREIGN PATENT DOCUMENTS

JP 7-306270 11/1995
JP 2000-187077 7/2000
JP 2002-071816 3/2002

OTHER PUBLICATIONS

T. Nakamura, et al., "Development for upgrading Japanese ENGIN-X type linear scintillation neutron detectors", JAEA-Research, 2008-116, Japan Atomic Energy Agency, 2009.03.
K. Kuroda, et al., "Poissonian-Type New Radiation Imager", Nuclear Instruments and Methods in Physics Research A 430 (1999) 311-320.
International Search Report and Written Opinion from PCT/JP2011/050231 mailed Mar. 15, 2011.

* cited by examiner

*Primary Examiner* — Kiho Kim
(74) *Attorney, Agent, or Firm* — Brundidge & Stanger, P.C.

(57) ABSTRACT

In a lattice-like pixel structure in which reflecting plates that reflect a fluorescent light from a fluorescent material-based neutron detecting sheet are arranged along vertical and horizontal axes at a regular interval, a lattice-like fluorescent light detecting member is provided, in which grooves may be formed at an upper half position of the vertical axis direction reflecting plate and at a center position in a vertical axis interval for accommodating a wavelength shifting fiber for vertical axis detection and at a lower half position of the horizontal axis direction reflecting plate and at a center position in a horizontal axis interval for accommodating a wavelength shifting fiber for horizontal axis detection; and a fluorescent material-based neutron detecting sheet is arranged only at a front surface or at both of a front surface and a back surface of the lattice-like fluorescent light detecting member.

10 Claims, 15 Drawing Sheets (A)

(B)

PIXEL-TYPE TWO-DIMENSIONAL IMAGE DETECTOR

BACKGROUND OF THE INVENTION

The present invention relates to a pixel-type two-dimensional image detector capable of detecting heavy particle beams such as, for example, alpha particle (particle beam having the mass heavier than the mass of proton) and neutron beam by using fluorescent materials in order to create two-dimensional images with much greater accuracy in associate with the incident beam intensity of heavy particle beam and neutron. The technologies for two-dimensional image detectors are useful for the space technology field as well as the nuclear technology field and the medical technology field.

Conventionally, as for the two-dimensional neutron image detector for heavy particle beams, more specifically, alpha particles, what have been used include a particle beam detector formed by combining a fluorescent material-based particle beam detecting sheet and a wavelength shifting fiber. As for the two-dimensional neutron image detector used for neutron scattering experiments using neutron sources generated by a nuclear reactor or an accelerator, what have been used include such a detector as being formed by combining a neutron-sensitive scintillator or a fluorescent neutron detecting sheet formed together with a fluorescent material and a neutron converter with a wavelength shifting fiber (refer to Patent Literatures 1 and 2, and Non-Patent Literature 1).

Such two-dimensional image detector is so configured that the position information may be obtained by using a cross-fiber reading method. What have been used include a cross-fiber reading method, including proven methods such as a method for determining the incident position by using a coincidence counting method using such a sheet configuration that a couple of wavelength shifting fiber bundles are arranged diagonally on the upper surface and the bottom surface of the fluorescent material sheet or the scintillator plate, a method for determining the incident position by using a coincidence counting method using such a sheet configuration that couple of wavelength shifting fiber bundles are arranged diagonally on the back surface of the scintillator by improving the cross-fiber reading method, and a method using such a sheet configuration that a couple of wavelength shifting fiber bundles are arranged diagonally and that scintillators are arranged on its upper surface and bottom surface (for example, refer to Patent Literatures 1 and 2, and Non-Patent Literature 1).

[Patent Literature 1] JP 2000-187007 A
[Patent Literature 2] JP 2002-71816 A
[Non-Patent Literature 1] Nucl. Instr. And Meth. , A430 (1999) PP. 311-320

BRIEF SUMMARY OF THE INVENTION

Problems to be Solved by the Invention

In the above described methods, in which the wavelength shifting fibers are arranged on a plane, there are such disadvantages that the construction of the two-dimensional image detector having a large detection area may require a complicated work, and that the fluorescent light may be diffused over the surrounding pixels other than the pixel at the incident position as there is no boundary between the pixels and thus the fluorescent light emitted from the fluorescent material sheet resultantly enter a plurality of wavelength shifting fibers.

An object of the present invention is to provide a pixel-type two-dimensional image detector capable of creating two-dimensional images with much greater accuracy in associate with the incident beam intensity of heavy particle beam and neutron by reducing the leakage of the fluorescent light, which is generated by heavy particle beam and neutron, into the pixels other than the incident pixel.

In the present invention, what is used as the detecting member for measuring the heavy particle beam is a fluorescent material-based heavy particle beam detecting sheet formed by applying the fluorescent material in the form of polycrystalline fine particle along with the binder onto the transparent substrate such as glass-based plate. In addition, as for the detecting member for measuring the neutron beam, what is used as the detecting member for measuring the neutron beam is a fluorescent material-based neutron detecting sheet formed by mixing the fluorescent material in the form of polycrystalline fine particle and the material including any one or both of $^6$Li element and $^{10}$B element, both acting as a neutron converter, and by applying this mixture along with the binder or sintering the mixture onto the metallic substrate such as aluminum plate. Such detecting sheet may be made translucent so that the leakage into the pixels other than the incident pixel may be reduced as much as possible. In addition, it will be appreciated that the detecting accuracy can be increased also by adjusting the thickness of the detecting sheet to be 0.7 mm or less in order to make the leakage area smaller.

Means for Solving the Problems

In the pixel-type two-dimensional image detector having the most simplified structure among the two-dimensional image detectors formed according to the present invention, a lattice-like fluorescent light detecting member is used as means for determining the incident position of the heavy particle beam or neutron by detecting the fluorescent light emitted from such detecting sheet as described above, in the lattice-like pixel structure in which the reflecting plates that reflect the fluorescent light from the fluorescent material-based heavy particle detecting sheet emitting the fluorescent light in response to the incident of the heavy particle beam are arranged along the vertical axis at regular intervals, and then the reflecting plates that reflect the fluorescent light are also arranged along the horizontal axis at regular intervals and at a right angle with respect to a series of fluorescent plates formed arranged along the vertical axis so as to configure resultantly a couple of series of fluorescent plates, which has such a structure that has any groove or hole being formed so as to put a single wavelength shifting fiber for vertical axis detection for detecting the fluorescent light at the upper half position of the reflecting plates arranged along the vertical axis and at the center position in the vertical axis intervals, and that any groove or hole being formed so as to put a single wavelength shifting fiber for horizontal axis detection for detecting the fluorescent light at the lower half position of the reflecting plates arranged along the horizontal axis and at the center position in the horizontal axis intervals.

Note that, though a single wavelength shifting fiber for vertical axis detection and a single wavelength shifting fiber for horizontal axis detection are provided for the individual pixel, respectively, in the most simplified structure among all described above, two or more wavelength shifting fibers may be provided for the individual pixels if required in case of expecting higher detection sensitivity.

Effects of the Invention

According to the present invention, it will be appreciated that the leakage of the fluorescent light to the pixels other than the incident pixel may be reduced significantly because the above described translucent and thin detecting sheets are arranged at the front surface or at both of the front surface and the back surface of the lattice-like fluorescent light detecting member that is comprised in the matrix-like pixels as described above so that the image detection for the heavy ion beam or neutron beam may be enabled.

DESCRIPTION OF THE PREFERRED EMBODIMENTS

The pixel-type two-dimensional image detector according to the present invention is composed of
a lattice-like fluorescent light detecting member comprising:
a series of vertical axis direction reflecting plates being arranged along the vertical axis direction at regular intervals, and a series of horizontal axis direction reflecting plates being arranged along the horizontal axis direction at a regular interval and at a right angle with respect to the vertical axis direction and having the same functionality as said series of vertical axis direction reflecting plates for reflecting the fluorescent light from the fluorescent material-based heavy particle detecting sheet;
at least one wavelength shifting fiber for vertical axis detection disposed at the uniformly divided position for the vertical axis intervals of pixels for detecting the fluorescent light in the vertical axis direction; and
at least one wavelength shifting fiber for horizontal axis detection disposed at the uniformly divided position for the horizontal axis intervals of pixels for detecting the fluorescent light in the horizontal axis direction; and
said the fluorescent material-based particle beam detecting sheet being arranged at the front surface or at both of the front surface and the back surface of the lattice-like fluorescent light detecting member and being for emitting the fluorescent light in response to the incident of the heavy particle beam or neutron, wherein a region enclosed by the vertical axis direction reflecting plate and the horizontal axis direction reflecting plate defines the individual pixel,
wherein
a plural of groove or holes are provided to be formed at the series of vertical axis reflecting plates so as to put the wavelength shifting fiber for vertical axis detection through the individual grave or hole one by one at the upper half position or lower half position of the series of vertical axis direction reflecting plates, and a plural of groove or holes are provided to be formed at the series of horizontal axis reflecting plates so as to put the wavelength shifting fiber for horizontal axis detection through the individual grave or hole one by one at the lower half position or upper half position of the series of vertical axis direction reflecting plates;
the fluorescent material-based particle beam detecting sheet is made of a translucent sheet; and
the fluorescent light with its wavelength converted by and emitted from the wavelength shifting fibers for vertical axis detection and the wavelength shifting fibers for horizontal axis detection is detected respectively, and then the detected signals are counted coincidentally so as to determine the incident position of the particle beam.

By referring to FIG. 1 through FIG. 15, the actual exemplary implementation of the above described principal structure will be described below.

[Embodiment]
(Embodiment 1)

Figure 1:
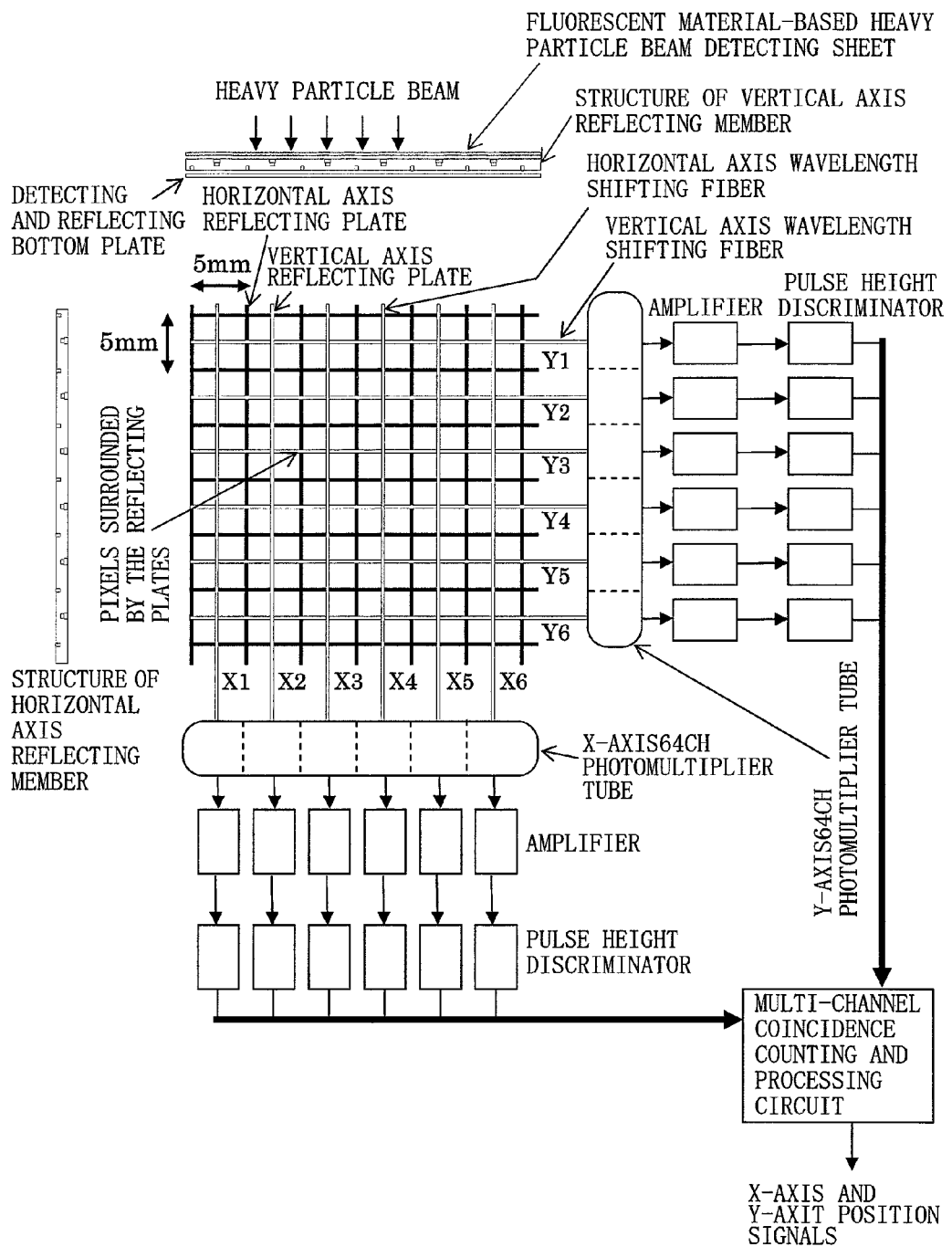
FIG. 1 illustrates a structure of the pixel-type two-dimensional image detector using heavy particle beam detecting medium according to one embodiment of the present invention.

As Embodiment 1, the structure of the pixel-type two-dimensional image detector using heavy particle beam detecting medium according to the present invention is shown in FIG. 1.

In this embodiment, a translucent and thin fluorescent material-based heavy particle beam detecting sheet is used as the heavy particle beam detecting medium, which may be formed by using ZnS:Ag as a fluorescent material, and applying the ZnS:Ag-based fluorescent material with the coating density of 30 mg/cm$^2$ onto the glass-based plate having the thickness of 0.1 mm by using the binder. A mirror-finished aluminum plate is used as the material for the fluorescent light reflecting bottom plate disposed at the bottom part.

Next, the lattice-like fluorescent light detecting member will be described below. As shown in FIG. 1, the reflecting plates each of which reflects the fluorescent light emitted from the fluorescent material-based heavy particle beam detecting sheet that emits the fluorescent light in response to the incident of the heavy particle beam may be arranged along the vertical axis at regular intervals. The interval between the adjacent reflecting plates may be defined to be 5 mm. In addition, the other reflecting plates each of which reflects the fluorescent light may be arranged along the horizontal axis at regular intervals and at a right angle with respect to a series of fluorescent plates formed arranged along the vertical axis. The interval between the adjacent reflecting plates in the horizontal direction may be defined to be 5 mm. A mirror-finished aluminum plate is used as the material for the reflecting plates, and its dimension may be defined to be the height of 2 mm, the length of 325 mm, and the thickness of 0.15 mm.

As for the method for manufacturing the lattice-like structure, a groove having the width being 100 □m wider than the thickness of the reflecting plate and the length being half of the depth width of the reflecting plate is formed on the reflecting plates arranged in the vertical axis direction and at the same interval as the interval of the reflecting plates arranged in the horizontal axis direction, and a groove having the width being 100 mm wider than the thickness of the reflecting plate and the length being half of the depth width of the vertical axis reflecting plate is formed on the reflecting plates arranged in the horizontal axis direction and at the same interval as the interval of the reflecting plates arranged in the vertical axis direction, and finally the vertical axis reflecting plate and the horizontal axis reflecting plate are made cross each other by using the grooves so formed as described above. In the subsequent embodiments, the lattice-like structure may be formed by the same method as described above.

In the lattice-like structure in which a series of vertical axis reflecting plates and a series of horizontal axis reflecting plates are formed in the way as described above, the structure is so provided that an individual groove may be formed at the upper half positions on the reflecting plate arranged in the vertical axis direction and at the center position on the vertical axis interval, that is, at the position corresponding to 2.5 mm in this embodiment, so as to accommodate a single wavelength shifting fiber for vertical axis detection for detecting the fluorescent light. As shown in FIG. 1, the groove may be shaped in combination of a semicircular part and a square part so as to prevent the fluorescent light from leaking out to the neighboring pixels. The diameter of the semicircular part may be 1.1 mm and the edge length of the square part may be 1.1 mm. As for the wavelength shifting fiber, BCF-92MC commercially available from Saint-Gobain K.K. is used, that is sensitive to the fluorescent light having the wavelength from 350 nm to 440 nm and transforms the wavelength of the fluorescent light into 490 nm. The wavelength shifting fiber may be shaped in a circular form with 1 mm diameter.

Similarly, the structure is so provided that an individual groove may be formed at the upper half positions on the reflecting plate arranged in the horizontal axis direction and at the center position on the horizontal axis interval so as to accommodate a single wavelength shifting fiber for vertical axis detection for detecting the fluorescent light. As shown in FIG. 1, the groove may be shaped in combination of a semicircular part and a square part so as to prevent the fluorescent light from leaking out to the neighboring pixels. The diameter of the semicircular part may be 1.1 mm and the edge length of the square part may be 1.1 mm.

As the wavelength of the fluorescent light emitted from ZnS:Ag-based fluorescent material has a distribution with its center at 450 nm, the emitted fluorescent light have a wavelength range from 360 nm to 540 nm and the life-time of the short life-time component of the emitted fluorescent light is 300 ns, BCF-92MC commercially available from Saint-Gobain K.K., that is sensitive to the fluorescent light having the wavelength from 350 nm to 440 nm and transforms the wavelength of the fluorescent light into 490 nm, is used as the wavelength shirting fiber. The wavelength shifting fiber may be shaped in a circular form with 1 mm diameter.

Now that the lattice-like fluorescent light detecting member is so formed as described above, ZnS:Ag may be used as the fluorescent material to be applied, and ZnS:Ag-based fluorescent material may be coated with the coating density of 30 mg/cm$^2$ onto the glass-based plate having the thickness of 0.1 mm by using the binder, and finally the fluorescent material-based heavy particle beam detecting sheet may be disposed only onto the front surface of the lattice-like fluorescent light detecting member.

As for the optical detector for detecting the emitted fluorescent light experienced with wavelength shifting by the wavelength shifting fibers BCF-92MC, H7546 commercially available from HAMAMATSU PHOTONICS K.K. may be used, that is a 64-channel photomultiplier tube, each channel having an effective sensitive area of 2 mm×2 mm. The individual photoelectric signals output from a couple of photomultiplier tubes for vertical axis and horizontal axis, respectively, are amplified by the amplifiers, and then the individual amplified signals are converted into the digital pulse signals by the pulse height discriminators, respectively, and finally X-axis pulse signal and Y-axis pulse signal are obtained. The two-dimensional incident position of the heavy particle beam is determined by applying the coincidence count measurement to both of the X-axis pulse signal and the Y-axis pulse signal. As for the coincidence count time (coincidence time), the coincidence count time (coincidence time) is defined to be 1 □s corresponding to about three times of the life time of the short life-time component of the fluorescent light from ZnS:Ag fluorescent material.

Using 65 reflecting plates and 64 wavelength shifting fibers for the vertical axis, and using 65 reflecting plates and 64 wavelength shifting fibers for the horizontal axis, a two-dimensional heavy particle beam image detector with 64 channels for the vertical axis and 64 channels for the horizontal axis, and with a large sensitive area with 320 mm×320 mm dimension for the heavy particle beam may be obtained.

(Embodiment 2)

Figure 2:
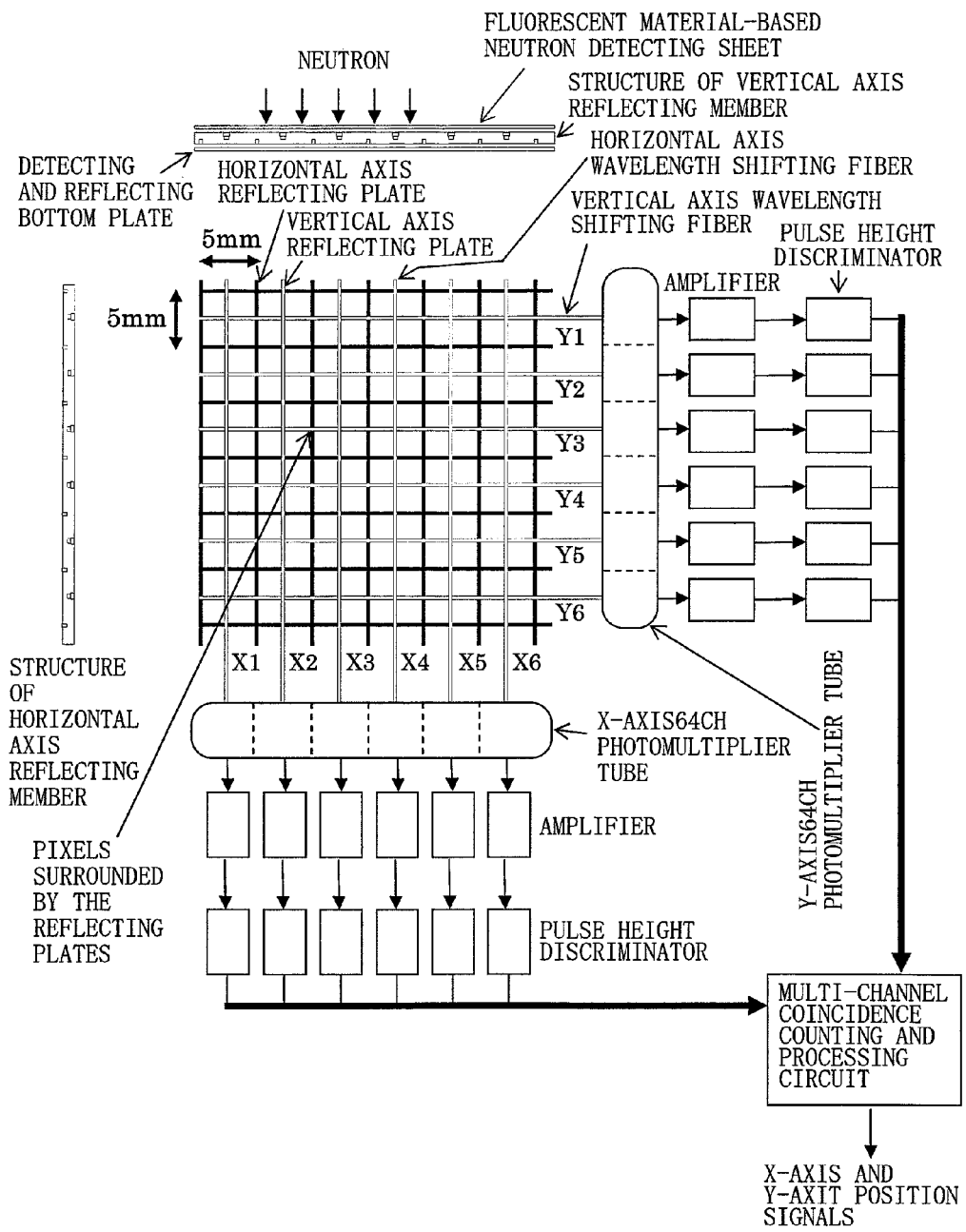
FIG. 2 illustrates a structure of the pixel-type two-dimensional image detector using neutron detecting medium according to one embodiment of the present invention.

As Embodiment 2, referring to FIG. 2, the pixel-type two-dimensional image detector using neutron detecting medium according to the present invention is described below. The structure of the two-dimensional image detector in Embodiment 2 is similar to the structure in Embodiment 1 except the structure of the detecting sheet.

In this embodiment, a neutron detecting sheet commercially available from AST in England (containing ZnS:Ag and $^6$LiF with a mixing ratio of 4:1) is used, which was manufactured by using ZnS:Ag as the neutron detecting medium, which may be formed by ZnS:Ag as a fluorescent material, and mixing them with binder material. This detecting sheet is translucent and its thickness is 0.45 mm.

Next, the lattice-like fluorescent light detecting member will be described below. As shown in FIG. 1, the reflecting plates each of which reflects the fluorescent light emitted from the fluorescent material-based neutron detecting sheet that emits the fluorescent light in response to the incident of the neutron may be arranged along the vertical axis at regular intervals. The interval between the adjacent reflecting plates may be defined to be 5 mm. In addition, the other reflecting plates each of which reflects the fluorescent light may be arranged along the horizontal axis at regular intervals and at a right angle with respect to a series of fluorescent plates formed arranged along the vertical axis. The interval between the adjacent reflecting plates in the horizontal direction may be defined to be 5 mm. A mirror-finished aluminum plate is used as the material for the reflecting plates, and its dimension may be defined to be the height of 2 mm, the length of 325 mm, and the thickness of 0.15 mm.

In the lattice-like structure in which a series of vertical axis reflecting plates and a series of horizontal axis reflecting plates are formed in the way as described above, the structure is so provided that an individual groove may be formed at the upper half positions on the reflecting plate arranged in the vertical axis direction and at the center position on the vertical axis interval, that is, at the position corresponding to 2.5 mm in this embodiment, so as to accommodate a single wavelength shifting fiber for vertical axis detection for detecting the fluorescent light. As shown in FIG. 1, the groove may be shaped in combination of a semicircular part and a square part so as to prevent the fluorescent light from leaking out to the neighboring pixels. The diameter of the semicircular part may be 1.1 mm and the edge length of the square part may be 1.1 mm. As for the wavelength shifting fiber, BCF-92MC commercially available from Saint-Gobain K.K. is used, that is sensitive to the fluorescent light having the wavelength from 350 nm to 440 nm and transforms the wavelength of the fluorescent light into 490 nm. The wavelength shifting fiber may be shaped in a circular form with 1 mm diameter.

Similarly, the structure is so provided that an individual groove may be formed at the upper half positions on the reflecting plate arranged in the horizontal axis direction and at the center position on the horizontal axis interval so as to accommodate a single wavelength shifting fiber for vertical axis detection for detecting the fluorescent light. As shown in FIG. 1, the groove may be shaped in combination of a semicircular part and a square part so as to prevent the fluorescent light from leaking out to the neighboring pixels. The diameter of the semicircular part may be 1.1 mm and the edge length of the square part may be 1.1 mm.

As the wavelength of the fluorescent light emitted from ZnS:Ag-based fluorescent material has a distribution with its center at 450 nm, the emitted fluorescent light have a wavelength range from 360 nm to 540 nm and the life-time of the short life-time component of the emitted fluorescent light is 300 ns, BCF-92MC commercially available from Saint-Gobain K.K., that is sensitive to the fluorescent light having the wavelength from 350 nm to 440 nm and transforms the wavelength of the fluorescent light into 490 nm, is used as the wavelength shirting fiber. The wavelength shifting fiber may be shaped in a circular form with 1 mm diameter.

Now that the lattice-like fluorescent light detecting member is so formed as described above, the neutron detecting sheet having the thickness of 0.45 mm commercially available from AST may be disposed only onto the front surface of the lattice-like fluorescent light detecting member.

A couple of wavelength shifting fibers, BCF-92MC, may be combined and connected to the optical detector. As for the optical detector for detecting the emitted fluorescent light experienced with wavelength shifting by the combined wavelength shifting fibers, H7546 commercially available from HAMAMATSU PHOTONICS K.K. may be used, that is a 64-channel photomultiplier tube, each channel having an effective sensitive area of 2 mm×2 mm. The individual photoelectric signals output from a couple of photomultiplier tubes for the vertical axis and the horizontal axis, respectively, are amplified by the amplifiers, and then the individual amplified signals are formed as X-axis pulse signal and Y-axis pulse signal. The two-dimensional neutron incident position is determined by coincident count measurement of X-axis pulse signal and Y-axis pulse signal. The coincidence count time (coincidence time) is defined to be 1 µs corresponding to about three times of the short life-time component of the fluorescent light from ZnS:Ag fluorescent material.

Using 65 reflecting plates and 64 wavelength shifting fibers for the vertical axis, and using 65 reflecting plates and 64 wavelength shifting fibers for the horizontal axis, a two-dimensional neutron image detector with 64 channels for the vertical axis and 64 channels for the horizontal axis, and with a large sensitive area with 320 mm×320 mm dimension for the neutron may be obtained.

Figure 14:
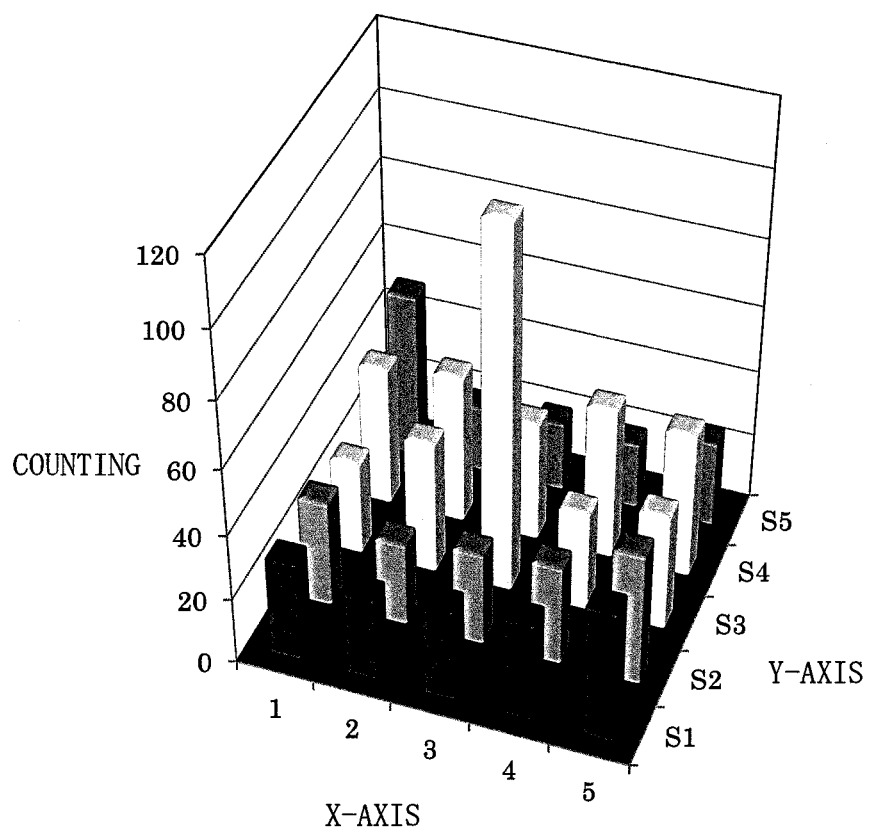
FIG. 14 illustrates the three-dimensional view of the influence of the fluorescent light over the surrounding pixels in the two-dimensional neutron image detector.

In order to estimate the effect of the fluorescent light over the surrounding pixels in the neutron image detector, neutron scattering experiments with YAG crystal were performed by using pulsed neutrons. Scattering from the single crystal was measured by using YAG crystal with a 3 mm×3 mm×3 mm dimension and a neutron image detector of this embodiment arranged at the position 50 cm apart from YGA crystal in the right angle to the direction of the neutron beam. As shown in FIG. 13(A) and FIG. 13(B), it is proved by the experimental result that a single peak can be observed at the single pixel due to the neutron scattering. For the better understanding of this result, FIG. 14 is provided for showing the cross-sectional distribution in the X-axis direction and the Y-axis direction, respectively. Most point values show background counts excluding one exceptional point. It is confirmed that there is almost no effect over the surrounding pixels in the X-axis and Y-axis.

Figure 15:
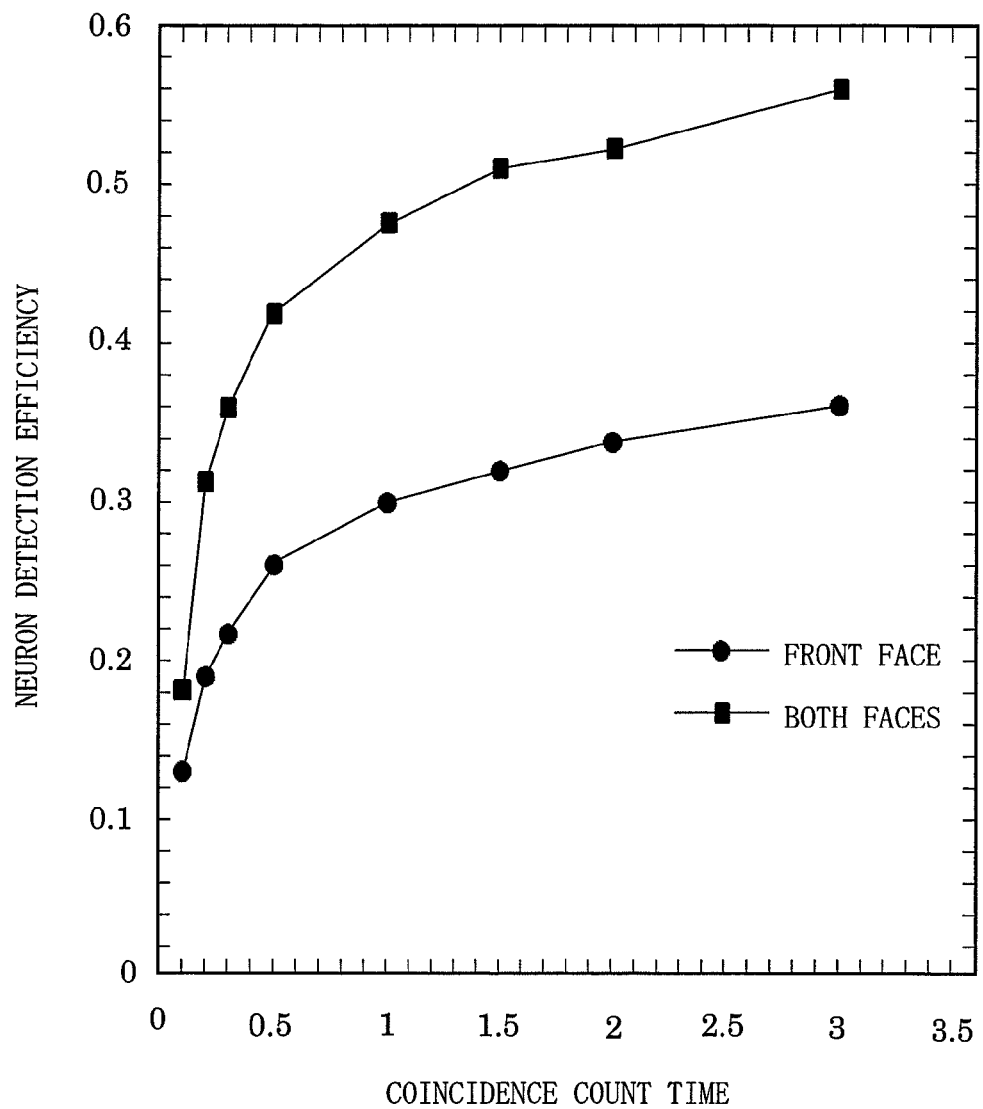
FIG. 15 shows the detection efficiency for thermal neutrons in case that the detecting sheets are arranged at the front surface or at both of the front surface and the back surface of the lattice-like fluorescent light detecting member.

As for the neutron detecting medium in this embodiment, a couple of ZnS:Ag/$^{10}B_2O_3$ neutron detecting sheets (containing ZnS:Ag and $H_3{}^{10}BO_3$ with a mixing ratio of 3:2), each having a thickness of 0.25 mm manufactured by sintering process using ZnS:Ag as a fluorescent material and using $^{10}B_2O_3$ as a neutron converter may be used and disposed at both of the front face and the rear face of the lattice-like fluorescent light detecting member, respectively, and then, its detection efficiency for the thermal neutrons was measured. FIG. 15 shows the measurement result of the detection efficiency for the coincidence count time varying from 0.1 □s to 3 □s. It is confirmed from the experimental result for the coincident count time of 1 □s that the detection efficiency was 30% in case that the neutron detecting sheet is disposed only at the front face and that the detection efficiency was 48% in case that the neutron detecting sheets are disposed at both of the front face and the rear face, that is, increased by 1.6 times.

(Embodiment 3)

Figure 3:
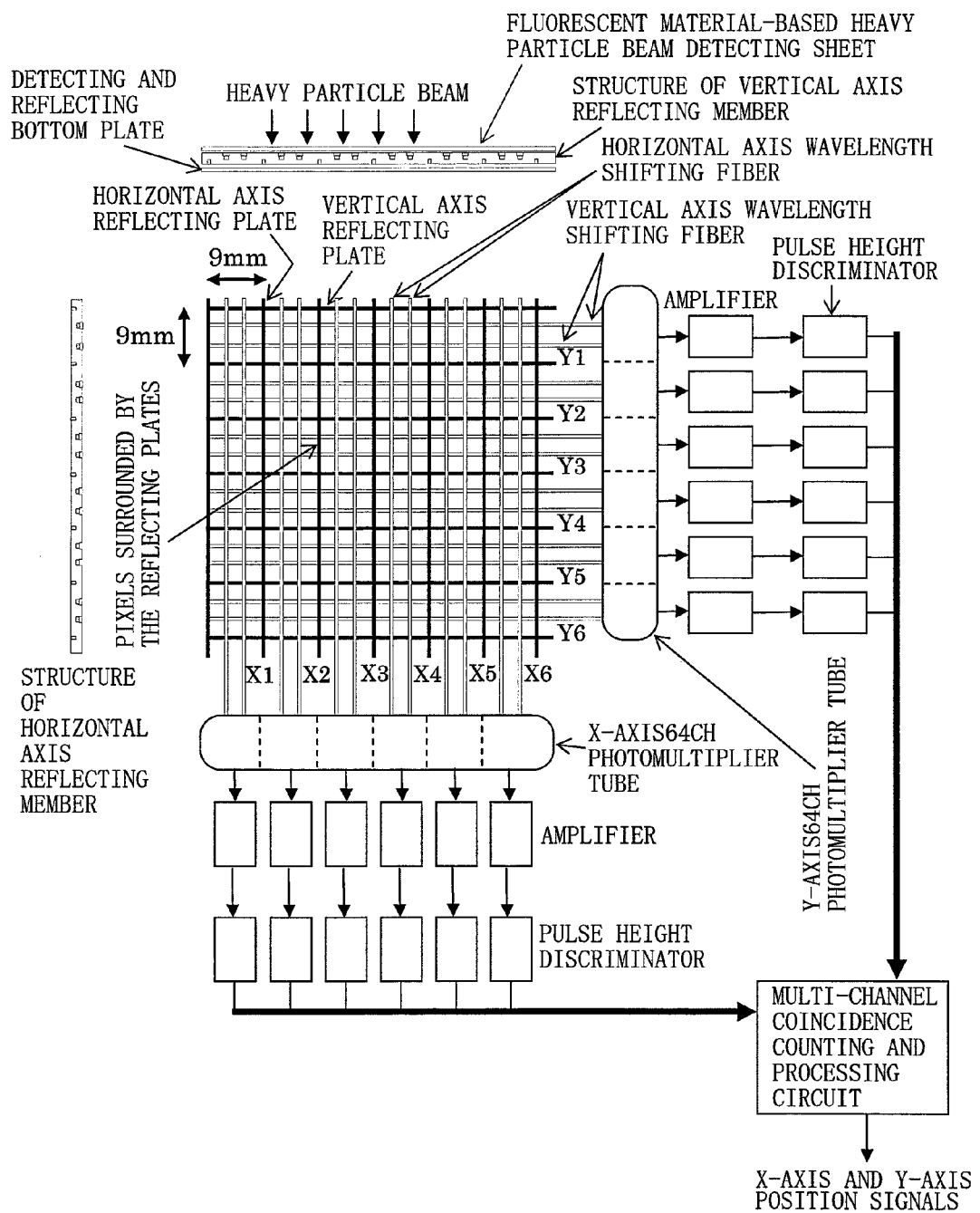
FIG. 3 illustrates a structure of the pixel-type two-dimensional image detector using heavy particle beam detecting medium according to another embodiment of the present invention.
Figure 4:
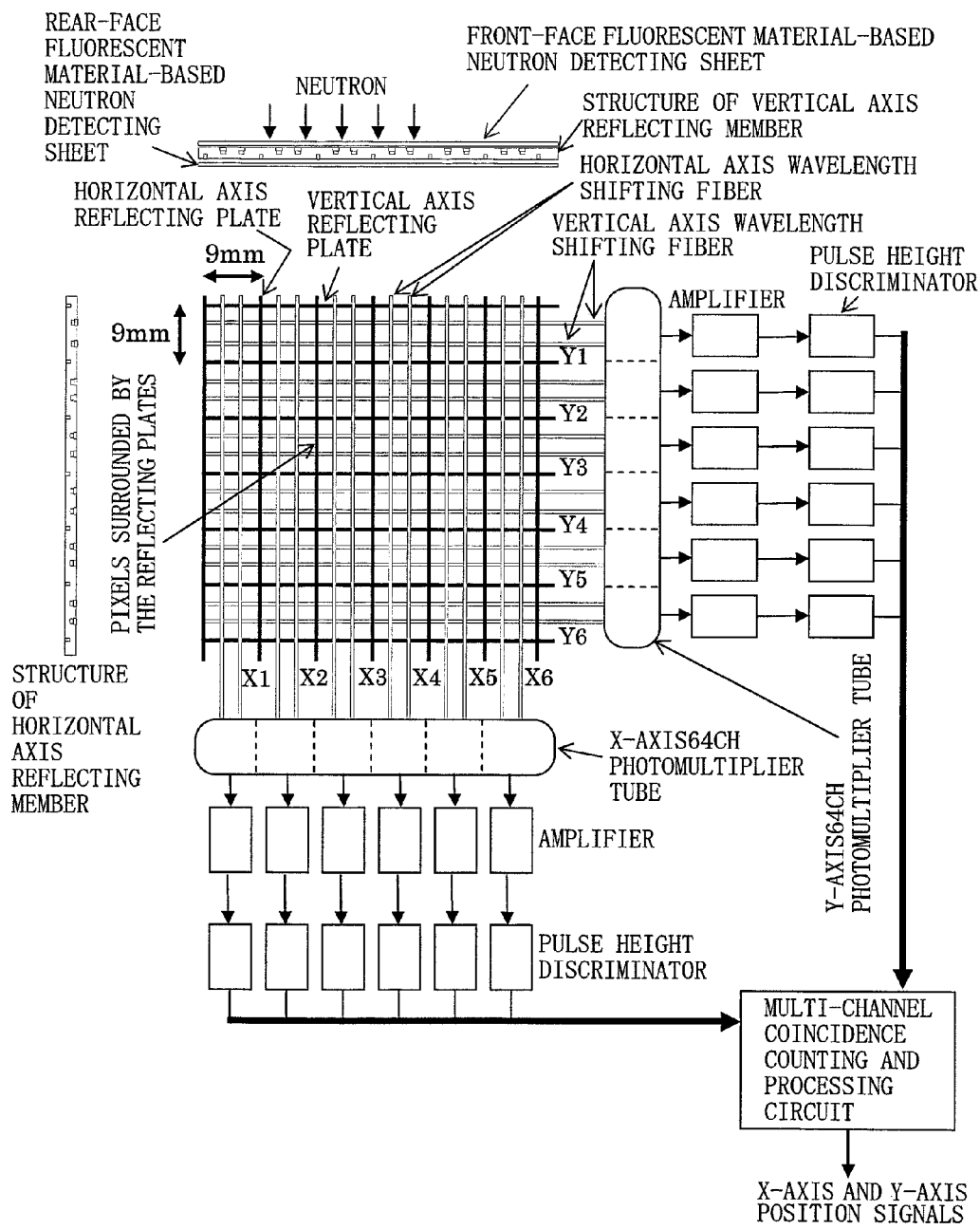
FIG. 4 illustrates a structure of the pixel-type two-dimensional image detector using neutron detecting medium according to another embodiment of the present invention.

As Embodiment 3, referring to FIG. 3, another pixel-type two-dimensional image detector using a heavy particle beam detecting sheet is described below.

In case that the intervals between reflecting plates in the vertical axis and the horizontal axis, respectively, are made wider in order to obtain a pixel size larger than that in Embodiments 1 and 2, it may be difficult to collect sufficiently the fluorescent light emitted from the fluorescent material-based heavy particle beam detecting sheet with a single wavelength shifting fiber for X-axis and a single wavelength shifting fiber for Y-axis, respectively. In order to solve this problem, it is required to increase the number of wavelength shifting fibers for X-axis and Y-axis, respectively.

In addition, in case that the diameter of the wavelength shifting fiber in the reflecting plate is made 1 mm or larger for the fiber with its cross-section shaped in a circular form, and that the edge of the wavelength shifting fiber in the reflecting plate is made 1 mm or larger for the fiber with its cross-section shaped in a square form, the fluorescent light may be absorbed only by the wavelength shifting fiber disposed at the upper part and hence the fluorescent light to be collected by the wavelength shifting fiber disposed at the lower part may be reduced, which resultantly leads to some increased count loss in the coincidence count measurement. As the wavelength shifting fiber is sensitive to gamma rays to be considered as the background for the heavy particle beam measurement, in case that the diameter of the wavelength shifting fiber is made 1 mm or larger for the fiber with its cross-section shaped in a circular form, and that the edge of the wavelength shifting fiber is made 1 mm or larger for the fiber with its cross-section shaped in a square form, the count loss may increase due to the dimension of the diameter or edge of the wavelength shifting fiber. Owing to those factors, in comparison to the intervals between adjacent reflecting plates in the vertical axis and the horizontal axis, respectively, in case that the diameter of the wavelength shifting fiber with its cross-section shaped in a circular form is small or in case that the edge of the wavelength shifting fiber with its cross-section shaped in a square form is short, it is difficult to collect sufficiently the fluorescent light emitted from the fluorescent material-based heavy particle beam detecting sheet. In order to solve this problem, it is required to increase the number of wavelength shifting fibers for X-axis and Y-axis, respectively.

This embodiment, in order to increase the pixel size, will be described for the case that the intervals between adjacent reflecting plates in the vertical axis and the horizontal axis is 9 mm. A mirror-finished aluminum plate is used as the material for the reflecting plates, and its dimension may be defined to be the height of 2 mm, the length of 585 mm, and the thickness of 0.15 mm.

In this embodiment, a fluorescent material-based heavy particle beam detecting sheet is used as the heavy particle beam detecting medium, which may be formed by using ZnS:Ag as a fluorescent material, and applying the ZnS:Ag-based fluorescent material with the coating density of 30 mg/cm$^2$ onto the glass-based plate having the thickness of 0.1 mm by using the binder. A mirror-finished aluminum plate is used as the material for the fluorescent light reflecting bottom plate disposed at the bottom part.

Next, the lattice-like fluorescent light detecting member will be described below. As shown in FIG. 3, the reflecting plates each of which reflects the fluorescent light emitted from the fluorescent material-based heavy particle beam detecting sheet that emits the fluorescent light in response to the incident of the heavy particle beam may be arranged along the vertical axis at regular intervals. The interval between the adjacent reflecting plates may be defined to be 9 mm. In addition, the other reflecting plates each of which reflects the fluorescent light may be arranged along the horizontal axis at regular intervals and at a right angle with respect to a series of fluorescent plates formed arranged along the vertical axis. The interval between the adjacent reflecting plates in the horizontal direction may be defined to be 9 mm. A mirror-finished aluminum plate is used as the material for the reflecting plates, and its dimension may be defined to be the height of 2 mm, the length of 585 mm, and the thickness of 0.15 mm.

In the lattice-like structure in which a series of vertical axis reflecting plates and a series of horizontal axis reflecting plates are formed in the way as described above, the structure is so provided that individual grooves may be formed at the upper half positions on the reflecting plate arranged in the vertical axis direction and at the center position on the vertical axis interval, that is, at the positions corresponding to 3 mm and 6 mm in this embodiment, so as to accommodate a couple of wavelength shifting fibers for vertical axis detection for detecting the fluorescent light. As shown in FIG. 3, the grooves may be shaped in combination of a semicircular part and a square part so as to prevent the fluorescent light from leaking out to the neighboring pixels. The diameter of the semicircular part may be 0.9 mm and the edge length of the square part may be 0.9 mm. As for the wavelength shifting fiber, BCF-92MC commercially available from Saint-Gobain K.K. is used, that is sensitive to the fluorescent light having the wavelength from 350 nm to 440 nm and transforms the wavelength of the fluorescent light into 490 nm. The wavelength shifting fiber may be shaped in a circular form with 0.8 mm diameter.

Similarly, the structure is so provided that an individual groove may be formed at the upper half positions on the reflecting plate arranged in the horizontal axis direction and at the center position on the horizontal axis interval so as to accommodate a single wavelength shifting fiber for vertical axis detection for detecting the fluorescent light. As shown in FIG. 1, the groove may be shaped in combination of a semicircular part and a square part so as to prevent the fluorescent light from leaking out to the neighboring pixels. The diameter of the semicircular part may be 0.9 mm and the edge length of the square part may be 0.9 mm.

As the wavelength of the fluorescent light emitted from ZnS:Ag-based fluorescent material has a distribution with its center at 450 nm, the emitted fluorescent light have a wavelength range from 360 nm to 540 nm and the life-time of the short life-time component of the emitted fluorescent light is 300 ns, BCF-92MC commercially available from Saint-Gobain K.K., that is sensitive to the fluorescent light having the wavelength from 350 nm to 440 nm and transforms the wavelength of the fluorescent light into 490 nm, is used as the wavelength shirting fiber. The wavelength shifting fiber may be shaped in a circular form with 0.8 mm diameter.

Now that the lattice-like fluorescent light detecting member is so formed as described above, ZnS:Ag may be used as the fluorescent material to be applied, and ZnS:Ag-based fluorescent material may be coated with the coating density of 30 mg/cm$^2$ onto the glass-based plate having the thickness of 0.1 mm by using the binder, and finally the fluorescent material-based heavy particle beam detecting sheet may be disposed only onto the front surface of the lattice-like fluorescent light detecting member. As for the optical detector for detecting the emitted fluorescent light experienced with wavelength shifting by the wavelength shifting fibers BCF-92MC, H7546 commercially available from HAMAMATSU PHOTONICS K.K. may be used, that is a 64-channel photomultiplier tube, each channel having an effective sensitive area of 2 mm×2 mm. The individual photoelectric signals output from a couple of photomultiplier tubes for vertical axis and horizontal axis, respectively, are amplified by the amplifiers, and then the individual amplified signals are converted into the digital pulse signals by the pulse height discriminators, respectively, and finally X-axis pulse signal and Y-axis pulse signal are obtained. The two-dimensional incident position of the heavy particle beam is determined by applying the coincidence count measurement to both of the X-axis pulse signal and the Y-axis pulse signal. As for the coincidence count time (coincidence time), the coincidence count time (coincidence time) is defined to be corresponding to about three times of the life time of the short life-time component of the fluorescent light from ZnS:Ag fluorescent material.

Using 65 reflecting plates and 64 wavelength shifting fibers for the vertical axis, and using 65 reflecting plates and 64 wavelength shifting fibers for the horizontal axis, a two-dimensional heavy particle beam image detector with 64 channels for the vertical axis and 64 channels for the horizontal axis, and with a large sensitive area with 576 mm×576 mm dimension for the heavy particle beam may be obtained.
(Embodiment 4)

As Embodiment 2, referring to FIG. 2, the pixel-type two-dimensional image detector according to the present invention using the neutron detecting medium according to the present invention is described below.

In case that the intervals between reflecting plates in the vertical axis and the horizontal axis, respectively, are made wider in order to obtain a pixel size larger than that in Embodiments 1 and 2, it may be difficult to collect sufficiently the fluorescent light emitted from the fluorescent material-based neutron detecting sheet with a single wavelength shifting fiber for X-axis and a single wavelength shifting fiber for Y-axis, respectively. In order to solve this problem, it is required to increase the number of wavelength shifting fibers for X-axis and Y-axis, respectively.

In addition, in case that the diameter of the wavelength shifting fiber in the reflecting plate is made 1 mm or larger for the fiber with its cross-section shaped in a circular form, and that the edge of the wavelength shifting fiber in the reflecting plate is made 1 mm or larger for the fiber with its cross-section shaped in a square form, the fluorescent light may be absorbed by the wavelength shifting fiber disposed at the upper part and hence the fluorescent light to be collected by the wavelength shifting fiber disposed at the lower part may be reduced, which resultantly leads to some increased count loss in the coincidence count measurement. As the wavelength shifting fiber is sensitive to gamma rays to be considered as the background for the neutron measurement, in case that the diameter of the wavelength shifting fiber is made 1 mm or larger for the fiber with its cross-section shaped in a circular form, and that the edge of the wavelength shifting fiber is made 1 mm or larger for the fiber with its cross-section shaped in a square form, the count loss may increase due to the dimension of the diameter or edge of the wavelength shifting fiber. Owing to those factors, in comparison to the intervals between adjacent reflecting plates in the vertical axis and the horizontal axis, respectively, in case that the diameter of the wavelength shifting fiber with its cross-section shaped in a circular form is small or in case that the edge of the wavelength shifting fiber with its cross-section shaped in a square form is short, it is difficult to collect sufficiently the fluorescent light emitted from the fluorescent material-based neutron detecting sheet. In order to solve this problem, it is required to increase the number of wavelength shifting fibers for X-axis and Y-axis, respectively.

This embodiment, in order to increase the pixel size, will be described for the case that the intervals between adjacent reflecting plates in the vertical axis and the horizontal axis is 9 mm.

In this embodiment, a neutron detecting sheet commercially available from AST in England (containing ZnS:Ag and $^6$LiF with a mixing ratio of 4:1) is used, which was manufactured by using ZnS:Ag as the neutron detecting medium, which may be formed by ZnS:Ag as a fluorescent material, and mixing them with binder material. The thickness of the detecting sheet is 0.45 mm. In this embodiment, a couple of neutron detection sheets are used.

Next, the lattice-like fluorescent light detecting member will be described below. As shown in FIG. 3, the reflecting plates each of which reflects the fluorescent light emitted from the fluorescent material-based heavy particle beam detecting sheet that emits the fluorescent light in response to the incident of the heavy particle beam may be arranged along the vertical axis at regular intervals. The interval between the adjacent reflecting plates may be defined to be 9 mm. In addition, the other reflecting plates each of which reflects the fluorescent light may be arranged along the horizontal axis at regular intervals and at a right angle with respect to a series of fluorescent plates formed arranged along the vertical axis. The interval between the adjacent reflecting plates in the horizontal direction may be defined to be 9 mm. A mirror-finished aluminum plate is used as the material for the reflecting plates, and its dimension may be defined to be the height of 2 mm, the length of 585 mm, and the thickness of 0.15 mm.

In the lattice-like structure in which a series of vertical axis reflecting plates and a series of horizontal axis reflecting plates are formed in the way as described above, the structure is so provided that individual grooves may be formed at the upper half positions on the reflecting plate arranged in the vertical axis direction and at the center position on the vertical axis interval, that is, at the positions corresponding to 3 mm and 6 mm in this embodiment, so as to accommodate a couple of wavelength shifting fibers for vertical axis detection for detecting the fluorescent light. As shown in FIG. 3, the grooves may be shaped in combination of a semicircular part and a square part so as to prevent the fluorescent light from leaking out to the neighboring pixels. The diameter of the semicircular part may be 0.9 mm and the edge length of the square part may be 0.9 mm. As for the wavelength shifting fiber, BCF-92MC commercially available from Saint-Gobain K.K. is used, that is sensitive to the fluorescent light having the wavelength from 350 nm to 440 nm and transforms the wavelength of the fluorescent light into 490 nm. The wavelength shifting fiber may be shaped in a circular form with 0.8 mm diameter.

Similarly, the structure is so provided that an individual groove may be formed at the upper half positions on the reflecting plate arranged in the horizontal axis direction and at the center position on the horizontal axis interval so as to accommodate a single wavelength shifting fiber for vertical axis detection for detecting the fluorescent light. As shown in FIG. 1, the groove may be shaped in combination of a semicircular part and a square part so as to prevent the fluorescent light from leaking out to the neighboring pixels. The diameter of the semicircular part may be 0.9 mm and the edge length of the square part may be 0.9 mm.

As the wavelength of the fluorescent light emitted from ZnS:Ag-based fluorescent material has a distribution with its center at 450 nm, the emitted fluorescent light have a wavelength range from 360 nm to 540 nm and the life-time of the short life-time component of the emitted fluorescent light is 300 ns, BCF-92MC commercially available from Saint-Gobain K.K., that is sensitive to the fluorescent light having the wavelength from 350 nm to 440 nm and transforms the wavelength of the fluorescent light into 490 nm, is used as the wavelength shirting fiber. The wavelength shifting fiber may be shaped in a circular form with 0.8 mm diameter.

Now that the lattice-like fluorescent light detecting member is so formed as described above, a couple of neutron detecting sheets, each having the thickness of 0.45 mm, commercially available from AST may be disposed onto both of the front surface and the back surface of the lattice-like fluorescent light detecting member.

As for the optical detector for detecting the emitted fluorescent light experienced with wavelength shifting by the wavelength shifting fibers BCF-92MC, H7546 commercially available from HAMAMATSU PHOTONICS K.K. may be used, that is a 64-channel photomultiplier tube, each channel having an effective sensitive area of 2 mm×2 mm. The individual photoelectric signals output from a couple of photomultiplier tubes for vertical axis and horizontal axis, respectively, are amplified by the amplifiers, and then the individual amplified signals are converted into the digital pulse signals by the pulse height discriminators, respectively, and finally X-axis pulse signal and Y-axis pulse signal are obtained. The two-dimensional incident position of the heavy particle beam is determined by applying the coincidence count measurement to both of the X-axis pulse signal and the Y-axis pulse signal. As for the coincidence count time (coincidence time), the coincidence count time (coincidence time) is defined to be 1 □s corresponding to about three times of the life time of the short life-time component of the fluorescent light from ZnS:Ag fluorescent material.

Using 65 reflecting plates and 64 wavelength shifting fibers for the vertical axis, and using 65 reflecting plates and 64 wavelength shifting fibers for the horizontal axis, a two-dimensional neutron image detector with 64 channels for the vertical axis and 64 channels for the horizontal axis, and with a large sensitive area with 576 mm×576 mm dimension for the neutron may be obtained.

(Embodiment 5)

Figure 5:
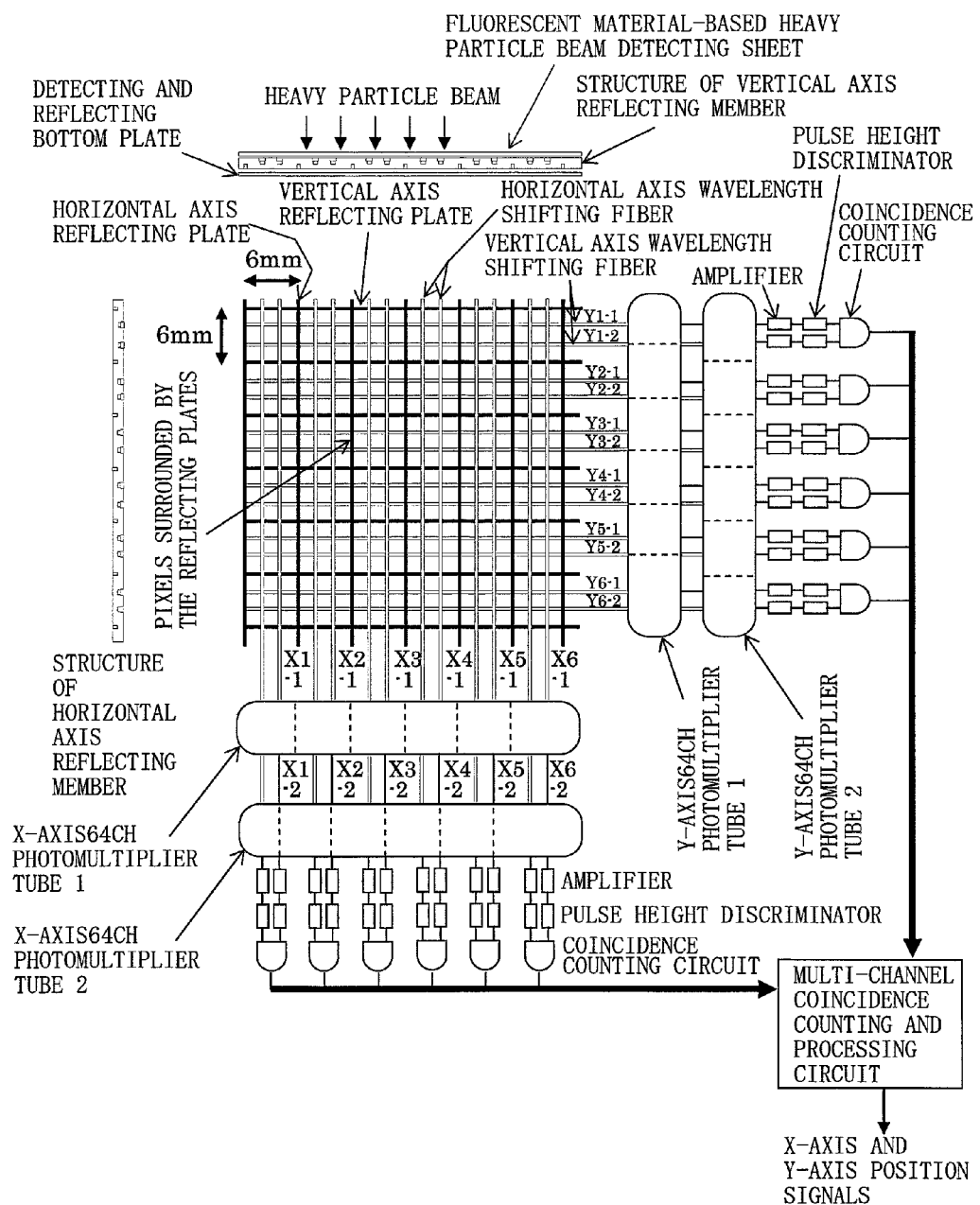
FIG. 5 illustrates a structure of the pixel-type two-dimensional image detector using heavy particle beam detecting medium according to another embodiment of the present invention.

As Embodiment 5, referring to FIG. 5, the pixel-type two-dimensional image detector according to the present invention using ZnS:Ag fluorescent material as the heavy particle beam detecting medium is described below.

In case of using ZnS as the fluorescent material, the life-time of the short life-time component of the fluorescent light is extremely as short as 300 ns, though the fluorescent light having the longer life-time component is also generated upon the light emission. The life-time of the longer life-time component of the fluorescent light is about as long as 70 □s, which may be defined as after-glow.

In this embodiment, a method for reducing the effect by after-glow in ZnS:Ag fluorescent material will be described. In Embodiment 1 as described above, the incident position of the heavy particle beam may be determined by applying coincidence counting process to a couple of fluorescent lights emitted from the single wavelength shifting fiber for the vertical axis and the single wavelength shifting fiber for the horizontal axis, respectively. Upon incidence of the heavy particle beam into the detector with a higher counting rate, the fluorescent light due to after-glow may not completely disappear, and hence the fluorescent light signals from the wavelength shifting fibers in the vertical axis and the horizontal axis in which the higher intensity of after-glow arises other than the incident position of the heavy particle beam may be measured as the coincidence count randomly, and identified as the positions corresponding to the background count. Specifically, in case of using the wavelength shifting fibers for detecting the fluorescent light, as the detection efficiency for the fluorescent light may be significantly as low as about 3%, and thus it is often required to use such a method that the detection of the fluorescent light by the photodetector may be performed by counting individual photons separately (photo-counting), the number of background counts measured randomly may increase.

In this embodiment, a fluorescent material-based heavy particle beam detecting sheet is used as the heavy particle beam detecting medium, which may be formed by using ZnS:Ag as a fluorescent material, and applying the ZnS:Ag-based fluorescent material with the coating density of 30 mg/cm$^2$ onto the glass-based plate having the thickness of 0.1 mm by using the binder. A mirror-finished aluminum plate is used as the material for the fluorescent light reflecting bottom plate disposed at the bottom part.

Next, the lattice-like fluorescent light detecting member will be described below. As shown in FIG. 1, the reflecting plates each of which reflects the fluorescent light emitted from the fluorescent material-based heavy particle beam detecting sheet that emits the fluorescent light in response to the incident of the heavy particle beam may be arranged along the vertical axis at regular intervals. The interval between the adjacent reflecting plates may be defined to be 6 mm. In addition, the other reflecting plates each of which reflects the fluorescent light may be arranged along the horizontal axis at regular intervals and at a right angle with respect to a series of fluorescent plates formed arranged along the vertical axis. The interval between the adjacent reflecting plates in the horizontal direction may be defined to be 6 mm. A mirror-finished aluminum plate is used as the material for the reflecting plates, and its dimension may be defined to be the height of 2 mm, the length of 390 mm, and the thickness of 0.15 mm.

In the lattice-like structure in which a series of vertical axis reflecting plates and a series of horizontal axis reflecting plates are formed in the way as described above, the structure is so provided that individual grooves may be formed at the upper half positions on the reflecting plate arranged in the vertical axis direction and at the center position on the vertical axis interval, that is, at the positions corresponding to 2 mm and 4 mm in this embodiment, so as to accommodate a couple of wavelength shifting fibers for vertical axis detection for detecting the fluorescent light. As shown in FIG. 3, the grooves may be shaped in combination of a semicircular part and a square part so as to prevent the fluorescent light from leaking out to the neighboring pixels. The diameter of the semicircular part may be 1.1 mm and the edge length of the square part may be 1.1 mm. As for the wavelength shifting fiber, BCF-92MC commercially available from Saint-Gobain K.K. is used, that is sensitive to the fluorescent light having the wavelength from 350 nm to 440 nm and transforms the wavelength of the fluorescent light into 490 nm. The wavelength shifting fiber may be shaped in a circular form with 1 mm diameter.

Similarly, the structure is so provided that an individual groove may be formed at the upper half positions on the reflecting plate arranged in the horizontal axis direction and at the center position on the horizontal axis interval so as to accommodate a single wavelength shifting fiber for vertical axis detection for detecting the fluorescent light. As shown in FIG. 1, the groove may be shaped in combination of a semicircular part and a square part so as to prevent the fluorescent light from leaking out to the neighboring pixels. The diameter of the semicircular part may be 1.1 mm and the edge length of the square part may be 1.1 mm.

As the wavelength of the fluorescent light emitted from ZnS:Ag-based fluorescent material has a distribution with its center at 450 nm, the emitted fluorescent light have a wavelength range from 360 nm to 540 nm and the life-time of the short life-time component of the emitted fluorescent light is 300 ns, BCF-92MC commercially available from Saint-Gobain K.K., that is sensitive to the fluorescent light having the wavelength from 350 nm to 440 nm and transforms the wavelength of the fluorescent light into 490 nm, is used as the wavelength shirting fiber. The wavelength shifting fiber may be shaped in a circular form with 1 mm diameter.

Now that the lattice-like fluorescent light detecting member is so formed as described above, ZnS:Ag may be used as the fluorescent material to be applied, and ZnS:Ag-based fluorescent material may be coated with the coating density of 30 mg/cm$^2$ onto the glass-based plate having the thickness of 0.1 mm by using the binder, and finally the fluorescent material-based heavy particle beam detecting sheet may be disposed only onto the front surface of the lattice-like fluorescent light detecting member.

As for the optical detector for detecting the emitted fluorescent light experienced with wavelength shifting by the wavelength shifting fibers BCF-92MC, H7546 commercially available from HAMAMATSU PHOTONICS K.K. may be used, that is a 64-channel photomultiplier tube, each channel having an effective sensitive area of 2 mm×2 mm. The individual photoelectric signals output from a couple of photomultiplier tubes for the vertical axis are amplified by the amplifiers, and then the individual amplified signals are converted into the digital pulse signals by the pulse height discriminators, respectively, and finally a couple of Y-axis position determining pulse signals are obtained. Applying the coincidence count measurement to a couple of Y-axis position determining pulse signals (for example, Y1-1 and Y1-2 for the first pixel), if the coincidence of those signals is detected, the incidence position in Y-axis is determined and then Y-axis pulse signal is provided. Similarly, the individual photoelectric signals output from a couple of photomultiplier tubes for the horizontal axis are amplified by the amplifiers, and then the individual amplified signals are converted into the digital pulse signals by the pulse height discriminators, respectively, and finally a couple of X-axis position determining pulse signals are obtained. Applying the coincidence count measurement to a couple of X-axis position determining pulse signals (for example, X1-1 and X1-2 for the first pixel), if the coincidence of those signals is detected, the incidence position in Y-axis may be determined and then Y-axis pulse signal is provided. Finally, in case that the coincidence of Y-axis pulse and X-axis pulse is detected, the two-dimensional incident position of the heavy particle beam may be determined. As for the coincidence count time (coincidence time), the coincidence count time (coincidence time) is defined to be 1 µs corresponding to about three times of the life time of the short life-time component of the fluorescent light from ZnS:Ag fluorescent material.

By repeating the coincidence count measurement three times, it will be appreciated that the event probability for the background counts occurring randomly due to after-glow in ZnS:Ag may be reduced.

Using 65 reflecting plates and 64 wavelength shifting fibers for the vertical axis, and using 65 reflecting plates and 64 wavelength shifting fibers for the horizontal axis, a two-dimensional heavy particle beam image detector with 64 channels for the vertical axis and 64 channels for the horizontal axis, and with a large sensitive area with 384 mm×384 mm dimension for the heavy particle beam may be obtained.
(Embodiment 6)

Figure 6:
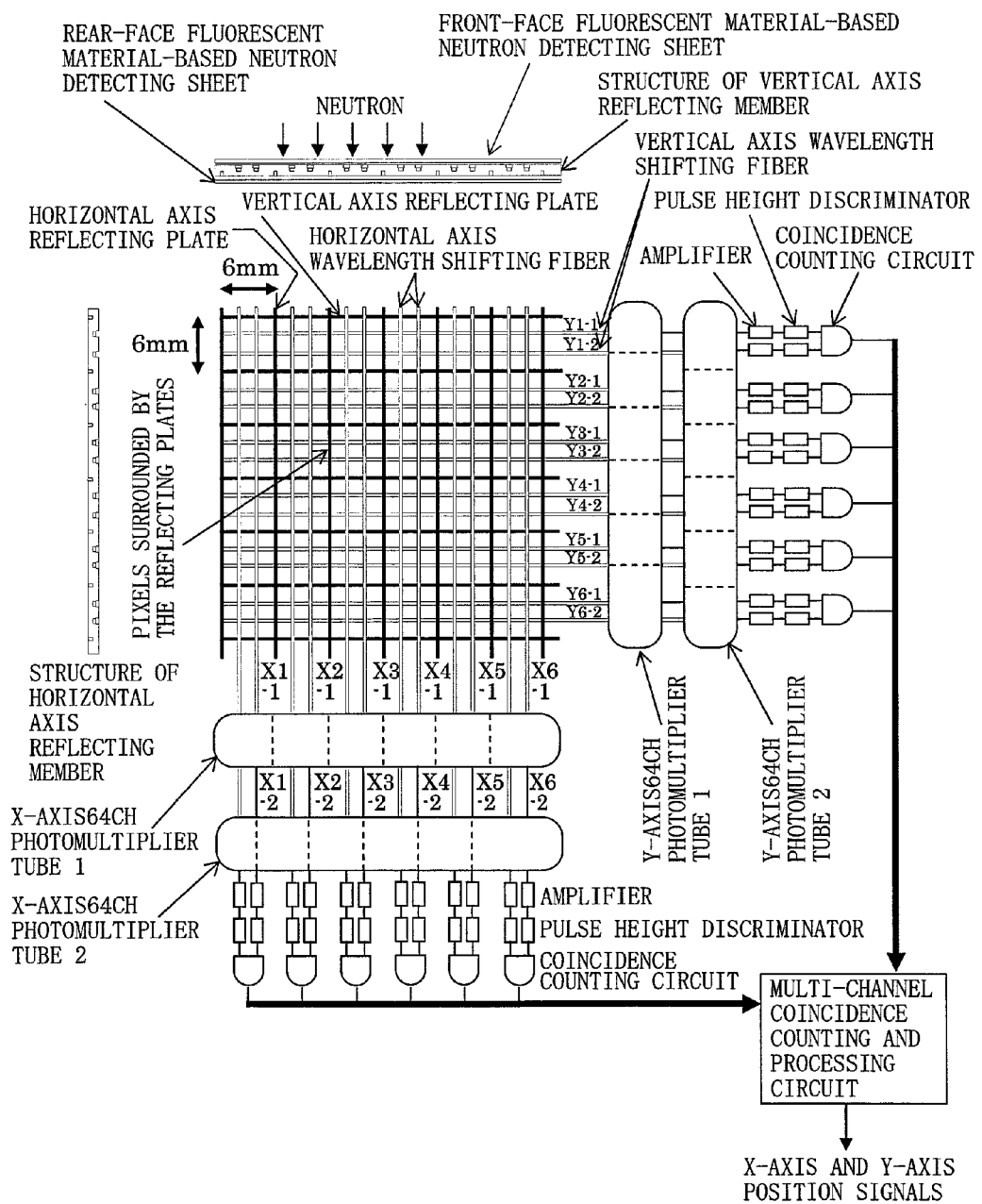
FIG. 6 illustrates a structure of the pixel-type two-dimensional image detector using neutron detecting medium according to another embodiment of the present invention.

As Embodiment 6, referring to FIG. 6, the pixel-type two-dimensional image detector according to the present invention using ZnS:Ag fluorescent material as the neutron detecting medium according to the present invention is described below.

In case of using ZnS as the fluorescent material, the life-time of the short life-time component of the fluorescent light is extremely as short as 300 ns, though the fluorescent light having the longer live-time component is also generated upon the light emission. The life-time of the longer life-time component of the fluorescent light is about as long as 70 µs, which may be defined as after-glow.

In this embodiment, a method for reducing the effect by after-glow in ZnS:Ag fluorescent material will be described. In Embodiment 1 as described above, the incident position of the neutron may be determined by applying coincidence counting process to a couple of fluorescent lights emitted from the single wavelength shifting fiber for the vertical axis and the single wavelength shifting fiber for the horizontal axis, respectively. Upon incidence of neutron into the detector with a higher counting rate, the fluorescent light due to after-glow may not completely disappear, and hence the fluorescent light signals from the wavelength shifting fibers in the vertical axis and the horizontal axis in which the higher intensity of after-glow arises other than the incident position of the heavy particle beam may be measured as the coincidence count randomly, and identified as the positions corresponding to the background count. Specifically, in case of using the wavelength shifting fibers for detecting the fluorescent light, as the detection efficiency for the fluorescent light may be significantly as low as about 3%, and thus it is often required to use such a method that the detection of the fluorescent light by the photodetector may be performed by counting individual photons separately (photo-counting), the number of background counts measured randomly may increase.

In this embodiment, a neutron detecting sheet commercially available from AST in England (containing ZnS:Ag and $^6$LiF with a mixing ratio of 4:1) is used, which was manufactured by using ZnS:Ag as the neutron detecting medium, which may be formed by ZnS:Ag as a fluorescent material, and mixing them with binder material. This detecting sheet is translucent and its thickness is 0.45 mm. In this embodiment, a couple of neutron detection sheets are used and disposed at both of the front face and the rear face of the lattice-like fluorescent light material.

Next, the lattice-like fluorescent light detecting member will be described below. As shown in FIG. 3, the reflecting plates each of which reflects the fluorescent light emitted from the fluorescent material-based neutron detecting sheet that emits the fluorescent light in response to the incident of the neutron may be arranged along the vertical axis at regular intervals. The interval between the adjacent reflecting plates may be defined to be 6 mm. In addition, the other reflecting plates each of which reflects the fluorescent light may be arranged along the horizontal axis at regular intervals and at a right angle with respect to a series of fluorescent plates formed arranged along the vertical axis. The interval between the adjacent reflecting plates in the horizontal direction may be defined to be 6 mm. A mirror-finished aluminum plate is used as the material for the reflecting plates, and its dimension may be defined to be the height of 2 mm, the length of 390 mm, and the thickness of 0.15 mm.

In the lattice-like structure in which a series of vertical axis reflecting plates and a series of horizontal axis reflecting plates are formed in the way as described above, the structure is so provided that individual grooves may be formed at the upper half positions on the reflecting plate arranged in the vertical axis direction and at the center position on the vertical axis interval, that is, at the positions corresponding to 2 mm and 4 mm in this embodiment, so as to accommodate a couple of wavelength shifting fibers for vertical axis detection for detecting the fluorescent light. As shown in FIG. 3, the grooves may be shaped in combination of a semicircular part and a square part so as to prevent the fluorescent light from leaking out to the neighboring pixels. The diameter of the semicircular part may be 1.1 mm and the edge length of the square part may be 1.1 mm. As for the wavelength shifting fiber, BCF-92MC commercially available from Saint-Gobain K.K. is used, that is sensitive to the fluorescent light having the wavelength from 350 nm to 440 nm and transforms the wavelength of the fluorescent light into 490 nm. The wavelength shifting fiber may be shaped in a circular form with 1 mm diameter.

Similarly, the structure is so provided that an individual groove may be formed at the upper half positions on the reflecting plate arranged in the horizontal axis direction and at the center position on the horizontal axis interval so as to accommodate a single wavelength shifting fiber for vertical axis detection for detecting the fluorescent light. As shown in FIG. 1, the groove may be shaped in combination of a semicircular part and a square part so as to prevent the fluorescent light from leaking out to the neighboring pixels. The diameter of the semicircular part may be 1.1 mm and the edge length of the square part may be 1.1 mm.

As the wavelength of the fluorescent light emitted from ZnS:Ag-based fluorescent material has a distribution with its center at 450 nm, the emitted fluorescent light have a wavelength range from 360 nm to 540 nm and the life-time of the short life-time component of the emitted fluorescent light is 300 ns, BCF-92MC commercially available from Saint-Gobain K.K., that is sensitive to the fluorescent light having the wavelength from 350 nm to 440 nm and transforms the wavelength of the fluorescent light into 490 nm, is used as the wavelength shirting fiber. The wavelength shifting fiber may be shaped in a circular form with 1 mm diameter.

As for the optical detector for detecting the emitted fluorescent light experienced with wavelength shifting by the wavelength shifting fibers BCF-92MC, H7546 commercially available from HAMAMATSU PHOTONICS K.K. may be used, that is a 64-channel photomultiplier tube, each channel having an effective sensitive area of 2 mm×2 mm. The individual photoelectric signals output from a couple of photomultiplier tubes for the vertical axis are amplified by the amplifiers, and then the individual amplified signals are converted into the digital pulse signals by the pulse height discriminators, respectively, and finally a couple of Y-axis position determining pulse signals are obtained. Applying the coincidence count measurement to a couple of Y-axis position determining pulse signals (for example, Y1-1 and Y1-2 for the first pixel), if the coincidence of those signals is detected, the incidence position in Y-axis is determined and then Y-axis pulse signal is provided. Similarly, the individual photoelectric signals output from a couple of photomultiplier tubes for the horizontal axis are amplified by the amplifiers, and then the individual amplified signals are converted into the digital pulse signals by the pulse height discriminators, respectively, and finally a couple of X-axis position determining pulse signals are obtained.

Applying the coincidence count measurement to a couple of X-axis position determining pulse signals (for example, X1-1 and X1-2 for the first pixel), if the coincidence of those signals is detected, the incidence position in Y-axis may be determined and then Y-axis pulse signal is provided. Finally, the coincidence of Y-axis pulse and X-axis pulse is detected, the two-dimensional incident position of the heavy particle beam may be determined. As for the coincidence count time (coincidence time), the coincidence count time (coincidence time) is defined to be 1 $\square$s corresponding to about three times of the life time of the short life-time component of the fluorescent light from ZnS:Ag fluorescent material.

By repeating the coincidence count measurement three times, it will be appreciated that the event probability for the background counts occurring randomly due to after-glow in ZnS:Ag may be reduced.

Using 65 reflecting plates and 64 wavelength shifting fibers for the vertical axis, and using 65 reflecting plates and 64 wavelength shifting fibers for the horizontal axis, a two-dimensional neutron image detector with 64 channels for the vertical axis and 64 channels for the horizontal axis, and with a large sensitive area with 384 mm×384 mm dimension for neutron may be obtained.

(Embodiment 7)

Figure 7:
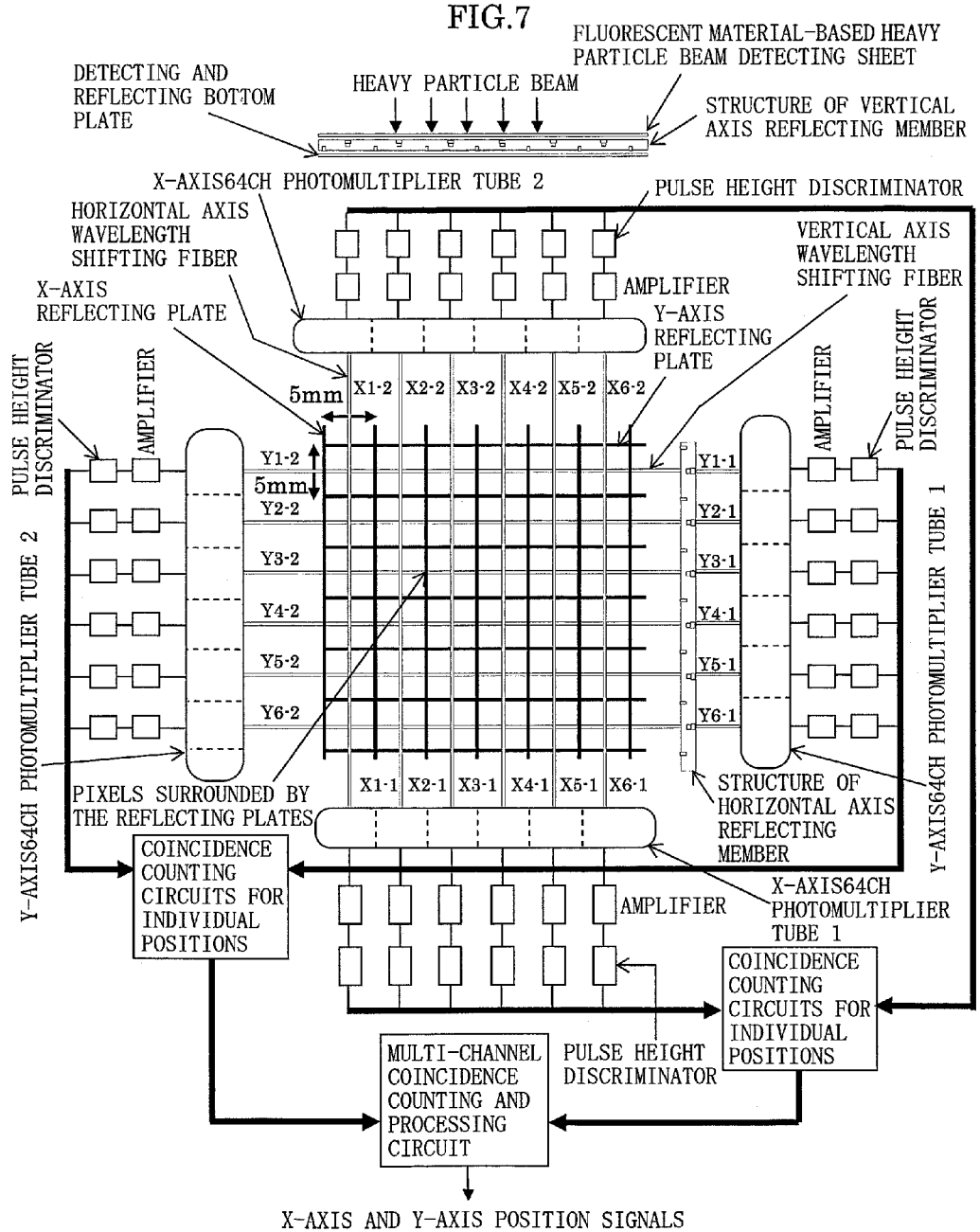
FIG. 7 illustrates a structure of the pixel-type two-dimensional image detector using heavy particle beam detecting medium according to another embodiment of the present invention.

As Embodiment 7, referring to FIG. 7, the pixel-type two-dimensional image detector according to the present invention using ZnS:Ag fluorescent material as the heavy particle beam detecting medium according to the present invention is described below.

In case of using ZnS as the fluorescent material, the life-time of the short life-time component of the fluorescent light is extremely as short as 300 ns, though the fluorescent light having the longer live-time component is also generated upon the light emission. The life-time of the longer life-time component of the fluorescent light is about as long as 70 µs, which may be defined as after-glow.

In this embodiment, a method for reducing the effect by after-glow in ZnS:Ag fluorescent material will be described. In Embodiment 1 as described above, the incident position of the heavy particle beam may be determined by applying coincidence counting process to a couple of fluorescent lights emitted from one end face of the single wavelength shifting fiber for the vertical axis and one end face of the single wavelength shifting fiber for the horizontal axis, respectively. Upon incidence of the heavy particle beam into the detector with a higher counting rate, the fluorescent light due to after-glow may not completely disappear, and hence the fluorescent light signals from the wavelength shifting fibers in the vertical axis and the horizontal axis in which the higher intensity of after-glow arises other than the incident position of the heavy particle beam may be measured as the coincidence count randomly, and identified as the positions corresponding to the background count. Specifically, in case of using the wavelength shifting fibers for detecting the fluorescent light, as the detection efficiency for the fluorescent light may be significantly as low as about 3%, and thus it is often required to use such a method that the detection of the fluorescent light by the photodetector may be performed by counting individual photons separately (photo-counting), the number of background counts measured randomly may increase.

In this embodiment, a fluorescent material-based heavy particle beam detecting sheet is used as the heavy particle beam detecting medium, which may be formed by using ZnS:Ag as a fluorescent material, and applying the ZnS:Ag-based fluorescent material with the coating density of 30 mg/cm$^2$ onto the glass-based plate having the thickness of 0.1 mm by using the binder. Owing to this configuration, after-glow affects the detection of the heavy particle beam. A mirror-finished aluminum plate is used as the material for the fluorescent light reflecting bottom plate disposed at the bottom part.

In order to solve the above problem, the fluorescent light emitted from the other end face of the wavelength shifting fiber may be also used in addition to the fluorescent light emitted from one end face of the individual wavelength shifting fiber for the vertical axis and the horizontal axis, respectively, in Embodiment 1.

The lattice-like fluorescent light detecting member will be described below. As shown in FIG. 3, the reflecting plates each of which reflects the fluorescent light emitted from the fluorescent material-based heavy particle beam detecting sheet that emits the fluorescent light in response to the incident of the heavy particle beam may be arranged along the vertical axis at regular intervals. The interval between the adjacent reflecting plates may be defined to be 5 mm. In addition, the other reflecting plates each of which reflects the fluorescent light may be arranged along the horizontal axis at regular intervals and at a right angle with respect to a series of fluorescent plates formed arranged along the vertical axis. The interval between the adjacent reflecting plates in the horizontal direction may be defined to be 5 mm. A mirror-finished aluminum plate is used as the material for the reflecting plates, and its dimension may be defined to be the height of 2 mm, the length of 325 mm, and the thickness of 0.15 mm.

In the lattice-like structure in which a series of vertical axis reflecting plates and a series of horizontal axis reflecting plates are formed in the way as described above, the structure is so provided that an individual groove may be formed at the upper half positions on the reflecting plate arranged in the vertical axis direction and at the center position on the vertical axis interval, that is, at the position corresponding to 2.5 mm in this embodiment, so as to accommodate a single wavelength shifting fiber for vertical axis detection for detecting the fluorescent light. As shown in FIG. 1, the groove may be shaped in combination of a semicircular part and a square part so as to prevent the fluorescent light from leaking out to the neighboring pixels. The diameter of the semicircular part may be 1.1 mm and the edge length of the square part may be 1.1 mm. As for the wavelength shifting fiber, BCF-92MC commercially available from Saint-Gobain K.K. is used, that is sensitive to the fluorescent light having the wavelength from 350 nm to 440 nm and transforms the wavelength of the fluorescent light into 490 nm. The wavelength shifting fiber may be shaped in a circular form with 1 mm diameter.

Similarly, the structure is so provided that an individual groove may be formed at the upper half positions on the reflecting plate arranged in the horizontal axis direction and at the center position on the horizontal axis interval so as to accommodate a single wavelength shifting fiber for vertical axis detection for detecting the fluorescent light. As shown in FIG. 1, the groove may be shaped in combination of a semicircular part and a square part so as to prevent the fluorescent light from leaking out to the neighboring pixels. The diameter of the semicircular part may be 1.1 mm and the edge length of the square part may be 1.1 mm.

As the wavelength of the fluorescent light emitted from ZnS:Ag-based fluorescent material has a distribution with its center at 450 nm, the emitted fluorescent light have a wavelength range from 360 nm to 540 nm and the life-time of the short life-time component of the emitted fluorescent light is 300 ns, BCF-92MC commercially available from Saint-Gobain K.K., that is sensitive to the fluorescent light having the wavelength from 350 nm to 440 nm and transforms the wavelength of the fluorescent light into 490 nm, is used as the wavelength shirting fiber. The wavelength shifting fiber may be shaped in a circular form with 1 mm diameter.

Now that the lattice-like fluorescent light detecting member is so formed as described above, ZnS:Ag may be used as the fluorescent material to be applied, and ZnS:Ag-based fluorescent material may be coated with the coating density of 30 mg/cm$^2$ onto the glass-based plate having the thickness of 0.1 mm by using the binder, and finally the fluorescent material-based heavy particle beam detecting sheet may be disposed only onto the front surface of the lattice-like fluorescent light detecting member.

As for the optical detector for detecting the emitted fluorescent light experienced with wavelength shifting by the wavelength shifting fibers BCF-92MC, H7546 commercially available from HAMAMATSU PHOTONICS K.K. may be used, that is a 64-channel photomultiplier tube, each channel having an effective sensitive area of 2 mm×2 mm. Both one end face and the other end face of the photomultiplier tube for vertical axis are connected to a couple of photomultiplier tubes, respectively, and fluorescent light electric signals are provided. The individual photoelectric signals provided as described above are amplified by the amplifiers, and then the individual amplified signals are converted into the digital pulse signals by the pulse height discriminators, respectively, and finally a couple of Y-axis pulse signals are obtained.

Applying the coincidence count measurement to a couple of Y-axis position determining pulse signals (for example, Y1-1 and Y1-2 for the first pixel), if the coincidence of those signals is detected, the incidence position in Y-axis is determined and then Y-axis pulse signal is provided. Similarly, both one end face and the other end face of the photomultiplier tube for horizontal axis are connected to a couple of photomultiplier tubes, respectively, and fluorescent light electric signals are provided. The individual photoelectric signals provided are amplified by the amplifiers, and then the individual amplified signals are converted into the digital pulse signals by the pulse height discriminators, respectively, and finally a couple of X-axis pulse signals are obtained. Applying the coincidence count measurement to a couple of X-axis position determining pulse signals (for example, X1-1 and X1-2 for the first pixel), if the coincidence of those signals is detected, the incidence position in X-axis is determined and then X-axis pulse signal is provided.

In case that the coincidence of Y-axis pulse and X-axis pulse is detected, the two-dimensional incident position of the heavy particle beam may be determined. As for the coincidence count time (coincidence time), the coincidence count time (coincidence time) is defined to be 1 µs corresponding to about three times of the life time of the short life-time component of the fluorescent light from ZnS:Ag fluorescent material.

By repeating the coincidence count measurement three times, it will be appreciated that the event probability for the background counts occurring randomly due to after-glow in ZnS:Ag may be reduced.

Using 65 reflecting plates and 64 wavelength shifting fibers for the vertical axis, and using 65 reflecting plates and 64 wavelength shifting fibers for the horizontal axis, a two-dimensional heavy particle beam image detector with 64 channels for the vertical axis and 64 channels for the horizontal axis, and with a large sensitive area with 320 mm×320 mm dimension for the heavy particle beam may be obtained.

(Embodiment 8)

Figure 8:
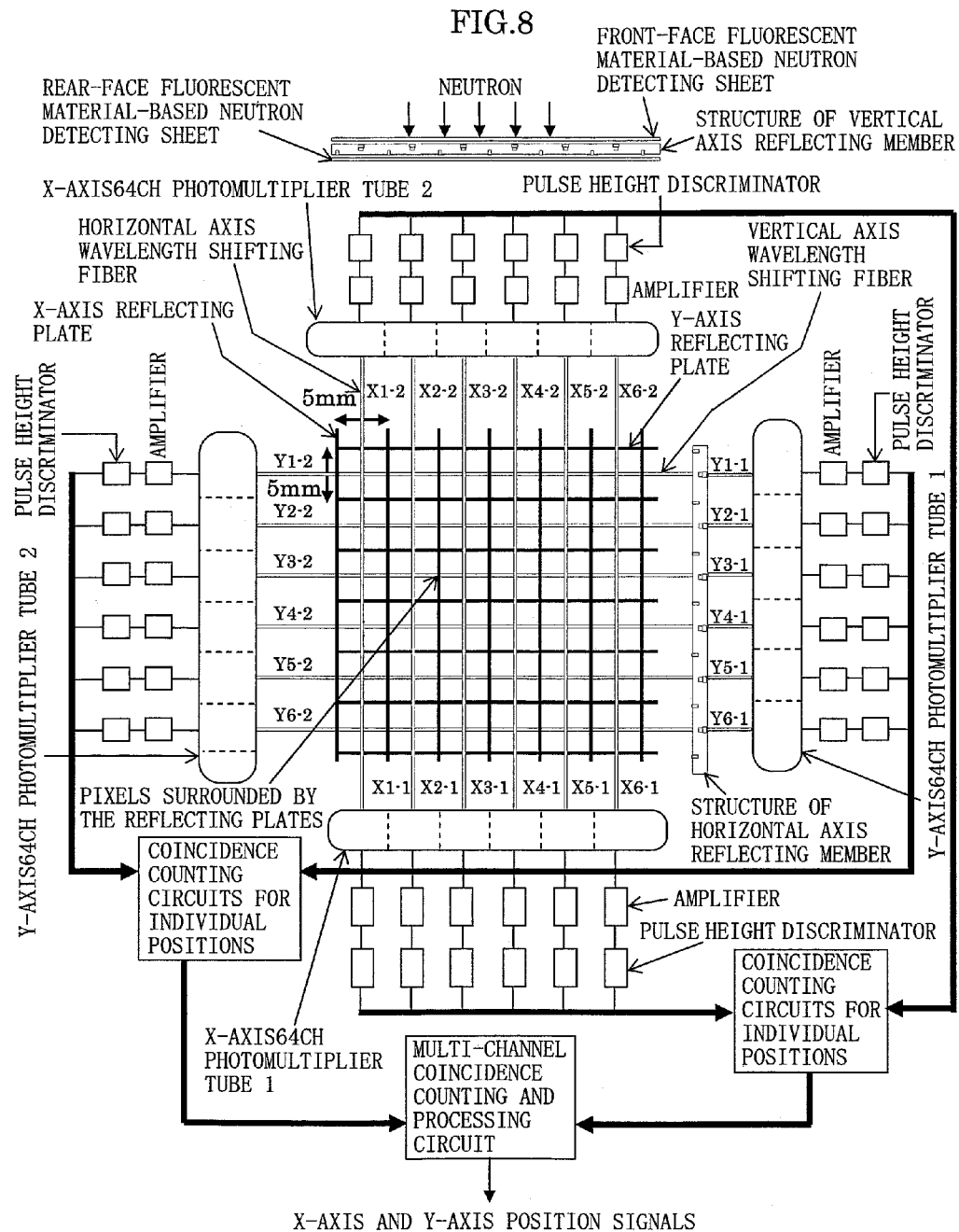
FIG. 8 illustrates a structure of the pixel-type two-dimensional image detector using neutron detecting medium according to another embodiment of the present invention.

As Embodiment 7, referring to FIG. 8, the pixel-type two-dimensional image detector according to the present invention using ZnS:Ag fluorescent material as the neutron detecting medium according to the present invention is described below.

In case of using ZnS as the fluorescent material, as shown in the figure, the life-time of the short life-time component of the fluorescent light is extremely as short as 300 ns, though the fluorescent light having the longer live-time component is also generated upon the light emission. The life-time of the longer life-time component of the fluorescent light is about as long as 70 µs, which may be defined as after-glow.

In this embodiment, a method for reducing the effect by after-glow in ZnS:Ag fluorescent material will be described. In Embodiment 1 as described above, the incident position of the heavy particle beam may be determined by applying coincidence counting process to a couple of fluorescent lights emitted from one end face of the single wavelength shifting fiber for the vertical axis and one end face of the single wavelength shifting fiber for the horizontal axis, respectively. Upon incidence of neutron into the detector with a higher counting rate, the fluorescent light due to after-glow may not completely disappear, and hence the fluorescent light signals from the wavelength shifting fibers in the vertical axis and the horizontal axis in which the higher intensity of after-glow arises other than the neutron incident position may be measured as the coincidence count randomly, and identified as the positions corresponding to the background count. Specifically, in case of using the wavelength shifting fibers for detecting the fluorescent light, as the detection efficiency for the fluorescent light may be significantly as low as about 3%, and thus it is often required to use such a method that the detection of the fluorescent light by the photodetector may be performed by counting individual photons separately (photo-counting), the number of background counts measured randomly may increase.

In this embodiment, a neutron detecting sheet commercially available from AST in England (containing ZnS:Ag and $^6$LiF with a mixing ratio of 4:1) is used, which was manufactured by using ZnS:Ag as the neutron detecting medium, which may be formed by ZnS:Ag as a fluorescent material, and mixing them with binder material. This detecting sheet is translucent and its thickness is 0.45 mm. In this embodiment, a couple of neutron detection sheets are used and disposed at both of the front face and the rear face of the lattice-like fluorescent light material.

In order to solve the above problem, the fluorescent light emitted from the other end face of the wavelength shifting fiber may be also advantageously used in addition to the fluorescent light emitted from one end face of the individual wavelength shifting fiber for the vertical axis and the horizontal axis, respectively, in Embodiment 1.

The lattice-like fluorescent light detecting member will be described below. As shown in FIG. 3, the reflecting plates each of which reflects the fluorescent light emitted from the fluorescent material-based neutron detecting sheet that emits the fluorescent light in response to the incident of neutron may be arranged along the vertical axis at regular intervals. The interval between the adjacent reflecting plates may be defined to be 5 mm. In addition, the other reflecting plates each of which reflects the fluorescent light at may be arranged along the horizontal axis at regular intervals and at a right angle with respect to a series of fluorescent plates formed arranged along the vertical axis. The interval between the adjacent reflecting plates in the horizontal direction may be defined to be 5 mm. A mirror-finished aluminum plate is used as the material for the reflecting plates, and its dimension may be defined to be the height of 2 mm, the length of 325 mm, and the thickness of 0.15 mm.

In the lattice-like structure in which a series of vertical axis reflecting plates and a series of horizontal axis reflecting plates are formed in the way as described above, the structure is so provided that an individual groove may be formed at the upper half positions on the reflecting plate arranged in the vertical axis direction and at the center position on the vertical axis interval, that is, at the position corresponding to 2.5 mm in this embodiment, so as to accommodate a single wavelength shifting fiber for vertical axis detection for detecting the fluorescent light. As shown in FIG. 1, the groove may be shaped in combination of a semicircular part and a square part so as to prevent the fluorescent light from leaking out to the neighboring pixels. The diameter of the semicircular part may be 1.1 mm and the edge length of the square part may be 1.1 mm. As for the wavelength shifting fiber, BCF-92MC commercially available from Saint-Gobain K.K. is used, that is sensitive to the fluorescent light having the wavelength from 350 nm to 440 nm and transforms the wavelength of the fluorescent light into 490 nm. The wavelength shifting fiber may be shaped in a circular form with 1 mm diameter.

Similarly, the structure is so provided that an individual groove may be formed at the upper half positions on the reflecting plate arranged in the horizontal axis direction and at the center position on the horizontal axis interval so as to accommodate a single wavelength shifting fiber for vertical axis detection for detecting the fluorescent light. As shown in FIG. 1, the groove may be shaped in combination of a semi-circular part and a square part so as to prevent the fluorescent light from leaking out to the neighboring pixels. The diameter of the semicircular part may be 1.1 mm and the edge length of the square part may be 1.1 mm.

As the wavelength of the fluorescent light emitted from ZnS:Ag-based fluorescent material has a distribution with its center at 450 nm, the emitted fluorescent light have a wavelength range from 360 nm to 540 nm and the life-time of the short life-time component of the emitted fluorescent light is 300 ns, BCF-92MC commercially available from Saint-Gobain K.K., that is sensitive to the fluorescent light having the wavelength from 350 nm to 440 nm and transforms the wavelength of the fluorescent light into 490 nm, is used as the wavelength shirting fiber. The wavelength shifting fiber may be shaped in a circular form with 1 mm diameter.

As for the optical detector for detecting the emitted fluorescent light experienced with wavelength shifting by the wavelength shifting fibers BCF-92MC, H7546 commercially available from HAMAMATSU PHOTONICS K.K. may be used, that is a 64-channel photomultiplier tube, each channel having an effective sensitive area of 2 mm×2 mm. Both one end face and the other end face of the photomultiplier tube for vertical axis are connected to a couple of photomultiplier tubes, respectively, and fluorescent light electric signals are provided. The individual photoelectric signals provided as described above are amplified by the amplifiers, and then the individual amplified signals are converted into the digital pulse signals by the pulse height discriminators, respectively, and finally a couple of Y-axis pulse signals are obtained. Applying the coincidence count measurement to a couple of Y-axis position determining pulse signals (for example, Y1-1 and Y1-2 for the first pixel), if the coincidence of those signals is detected, the incidence position in Y-axis is determined and then Y-axis pulse signal is provided. Similarly, both one end face and the other end face of the photomultiplier tube for horizontal axis are connected to a couple of photomultiplier tubes, respectively, and fluorescent light electric signals are provided.

The individual photoelectric signals provided are amplified by the amplifiers, and then the individual amplified signals are converted into the digital pulse signals by the pulse height discriminators, respectively, and finally a couple of X-axis pulse signals are obtained. Applying the coincidence count measurement to a couple of X-axis position determining pulse signals (for example, X1-1 and X1-2 for the first pixel), if the coincidence of those signals is detected, the incidence position in X-axis is determined and then X-axis pulse signal is provided.

In case that the coincidence of Y-axis pulse and X-axis pulse is detected, the two-dimensional neutron incident position may be determined. As for the coincidence count time (coincidence time), the coincidence count time (coincidence time) is defined to be his corresponding to about three times of the life time of the short life-time component of the fluorescent light from ZnS:Ag fluorescent material.

By repeating the coincidence count measurement three times, it will be appreciated that the event probability for the background counts occurring randomly due to after-glow in ZnS:Ag may be reduced.

Using 65 reflecting plates and 64 wavelength shifting fibers for the vertical axis, and using 65 reflecting plates and 64 wavelength shifting fibers for the horizontal axis, a two-dimensional heavy particle beam image detector with 64 channels for the vertical axis and 64 channels for the horizontal axis, and with a large sensitive area with 320 mm×320 mm dimension for neutron may be obtained.

(Embodiment 9)

Figure 9:
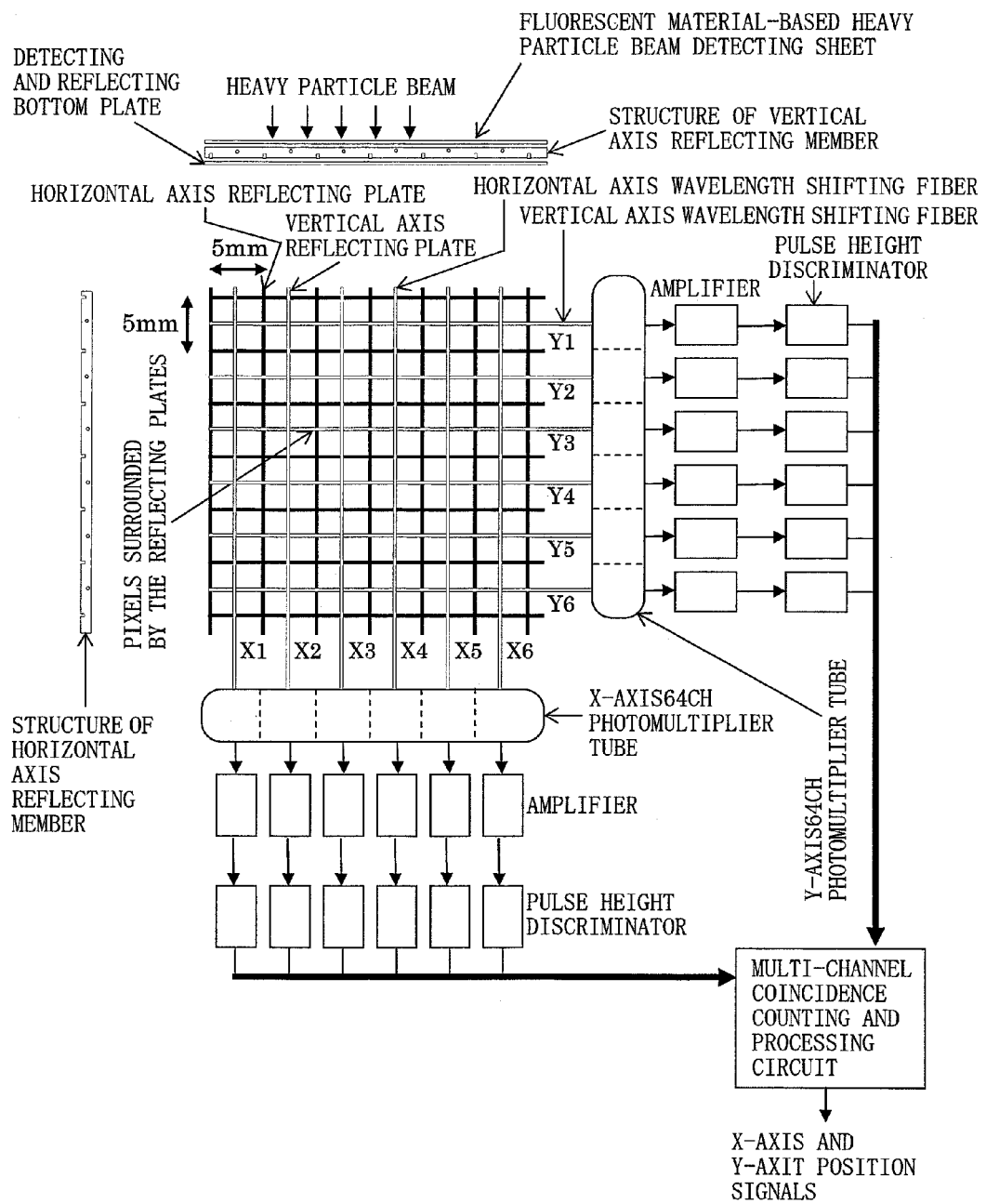
FIG. 9 illustrates a structure of the pixel-type two-dimensional image detector using heavy particle beam detecting medium according to another embodiment of the present invention.

As Embodiment 9, referring to FIG. 9, the pixel-type two-dimensional image detector according to the present invention using the heavy particle beam detecting medium is described below.

In this embodiment, a translucent and thin fluorescent material-based heavy particle beam detecting sheet is used as the heavy particle beam detecting medium, which may be formed by using ZnS:Ag as a fluorescent material, and applying the ZnS:Ag-based fluorescent material with the coating density of 30 mg/cm$^2$ onto the glass-based plate having the thickness of 0.1 mm by using the binder. A mirror-finished aluminum plate is used as the material for the fluorescent light reflecting bottom plate disposed at the bottom part.

In case that the wavelength shifting fiber for vertical axis in the lattice-like fluorescent light detecting member, which will be described later, disposed behind the fluorescent material-based heavy particle beam detecting sheet is configured to contact firmly to this detecting sheet, the fluorescent light emitted from the detecting sheet close to this firmly contact portion may be absorbed by the wavelength shifting fiber for vertical axis and the fraction of the fluorescent light directly detected by the wavelength shifting fiber for horizontal axis disposed below may become significantly low. In order to remedy this defect, it is required to keep a distance between the fluorescent material-based heavy particle beam detecting sheet and the wavelength shifting fiber for vertical axis. In case of attempting to realize this structure in Embodiment 1, the fluorescent light may leak out to the neighboring pixels because a clearance gap resulted from the distance kept as described above is formed at the reflecting plate.

BCF-92MC commercially available from Saint-Gobain K.K., that is sensitive to the fluorescent light having the wavelength from 350 nm to 440 nm and transforms the wavelength of the fluorescent light into 490 nm, is used as the wavelength shirting fiber. The wavelength shifting fiber may be shaped in a circular form with 1 mm diameter.

In order to remedy the above described defect, in this embodiment, in the lattice-like structure in which a series of vertical axis reflecting plates and a series of horizontal axis reflecting plates are formed, the structure is so provided that an individual hole may be formed at the upper half positions on the reflecting plate arranged in the vertical axis direction and at the center position on the vertical axis interval, that is, at the position corresponding to 2.5 mm in this embodiment, so as to accommodate a single wavelength shifting fiber for vertical axis detection for detecting the fluorescent light. As shown in FIG. 9, the hole may be shaped in a circular form with 1.1 mm diameter and with a center position being shifted 1 mm from the upper part of the reflecting part so as to prevent the fluorescent light from leaking out to the neighboring pixels. Owing to such structure, it will be appreciated that an interval of 0.5 mm may be provided between the fluorescent material-based heavy particle beam detecting sheet and the surface of the wavelength shifting fiber for vertical axis, which can remedy the above described defect.

Similarly, the structure is so provided that an individual hole may be formed at the upper half positions on the reflecting plate arranged in the vertical axis direction and at the center position on the vertical axis interval, that is, at the position corresponding to 2.5 mm in this embodiment, so as to accommodate a single wavelength shifting fiber for vertical axis detection for detecting the fluorescent light. As shown in FIG. 9, the hole may be shaped in a circular form with 1.1 mm diameter and with a center position being shifted 1 mm from the upper part of the reflecting part so as to prevent the fluorescent light from leaking out to the neighboring pixels. Owing to such structure, it will be appreciated that an interval of 0.5 mm may be provided between the fluorescent light reflecting bottom plate disposed at the bottom part and the surface of the wavelength shifting fiber for horizontal axis, which can prevent the light condensing ratio from decreasing by means of firm contact between the fluorescent light reflecting bottom plate and the surface of the wavelength shifting fiber for horizontal axis.

The usage method and related descriptions of the lattice-like fluorescent light detecting member so formed as described above are the same as Embodiment 1, which will not be repeated herein.

Using 65 reflecting plates and 64 wavelength shifting fibers for the vertical axis, and using 65 reflecting plates and 64 wavelength shifting fibers for the horizontal axis, a two-dimensional heavy particle beam image detector with 64 channels for the vertical axis and 64 channels for the horizontal axis, and with a large sensitive area with 320 mm×320 mm dimension for the heavy particle beam may be obtained.

(Embodiment 10)

Figure 10:
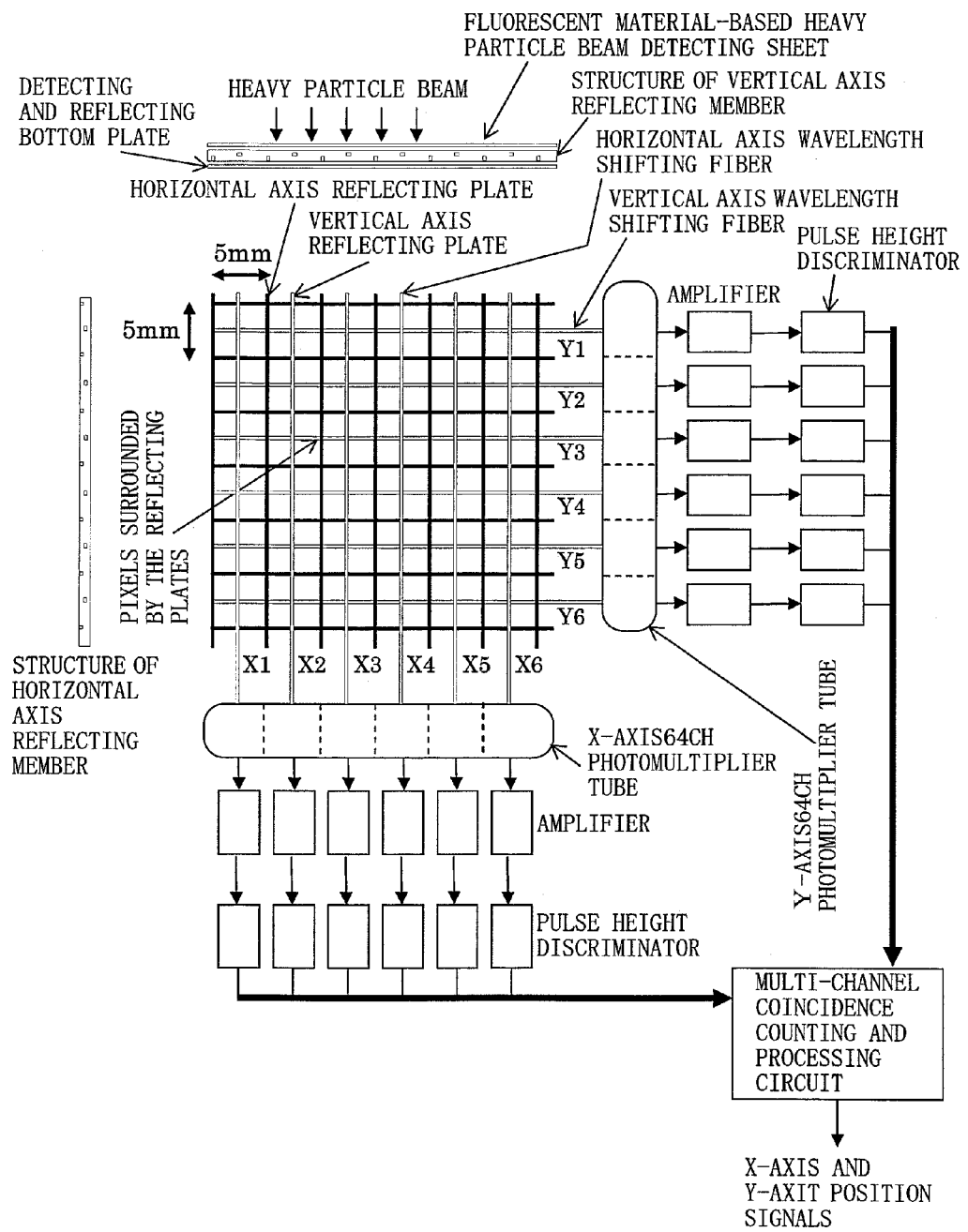
FIG. 10 illustrates a structure of the pixel-type two-dimensional image detector using heavy particle beam detecting medium according to another embodiment of the present invention.

As Embodiment 10, referring to FIG. 10, the pixel-type two-dimensional image detector according to the present invention using the heavy particle beam detecting medium is described below.

In this embodiment, a translucent and thin fluorescent material-based heavy particle beam detecting sheet is used as the heavy particle beam detecting medium, which may be formed by using ZnS:Ag as a fluorescent material, and applying the ZnS:Ag-based fluorescent material with the coating density of 30 mg/cm$^2$ onto the glass-based plate having the thickness of 0.1 mm by using the binder. A mirror-finished aluminum plate is used as the material for the fluorescent light reflecting bottom plate disposed at the bottom part.

In case that the wavelength shifting fiber for vertical axis in the lattice-like fluorescent light detecting member, which will be described later, disposed behind the fluorescent material-based heavy particle beam detecting sheet is configured to contact firmly to this detecting sheet, the fluorescent light emitted from the detecting sheet close to this firmly contact portion may be absorbed by the wavelength shifting fiber for vertical axis and the fraction of the fluorescent light directly detected by the wavelength shifting fiber for horizontal axis disposed below may become significantly low. In order to remedy this defect, it is required to keep a distance between the fluorescent material-based heavy particle beam detecting sheet and the wavelength shifting fiber for vertical axis. In case of attempting to realize this structure in Embodiment 1, the fluorescent light may leak out to the neighboring pixels because a clearance gap resulted from the distance kept as described above is formed at the reflecting plate.

BCF-92MC commercially available from Saint-Gobain K.K., that is sensitive to the fluorescent light having the wavelength from 350 nm to 440 nm and transforms the wavelength of the fluorescent light into 490 nm, is used as the wavelength shirting fiber. The wavelength shifting fiber may be shaped in a square form with 1 mm edge.

In order to remedy the above described defect, in this embodiment, in the lattice-like structure in which a series of vertical axis reflecting plates and a series of horizontal axis reflecting plates are formed, the structure is so provided that an individual hole may be formed at the upper half positions on the reflecting plate arranged in the vertical axis direction and at the center position on the vertical axis interval, that is, at the position corresponding to 2.5 mm in this embodiment, so as to accommodate a single wavelength shifting fiber for vertical axis detection for detecting the fluorescent light. As shown in FIG. 10, the hole may be shaped in a square form with 1.1 mm edge and with a center position being shifted 1 mm from the upper part of the reflecting plate so as to prevent the fluorescent light from leaking out to the neighboring pixels. Owing to such structure, it will be appreciated that an interval of 0.5 mm may be provided between the fluorescent material-based heavy particle beam detecting sheet and the surface of the wavelength shifting fiber for vertical axis, which can remedy the above described defect.

Similarly, the structure is so provided that an individual hole may be formed at the upper half positions on the reflecting plate arranged in the vertical axis direction and at the center position on the vertical axis interval, that is, at the position corresponding to 2.5 mm in this embodiment, so as to accommodate a single wavelength shifting fiber for vertical axis detection for detecting the fluorescent light. As shown in FIG. 10, the hole may be shaped in a square form with 1.1 mm edge and with a center position being shifted 1 mm from the upper part of the reflecting plate so as to prevent the fluorescent light from leaking out to the neighboring pixels. Owing to such structure, it will be appreciated that an interval of 0.5 mm may be provided between the fluorescent light reflecting bottom plate disposed at the bottom part and the surface of the wavelength shifting fiber for horizontal axis, which can prevent the light condensing ratio from decreasing by means of firm contact between the fluorescent light reflecting bottom plate and the surface of the wavelength shifting fiber for horizontal axis.

The usage method and related descriptions of the lattice-like fluorescent light detecting member so formed as described above are the same as Embodiment 1, which will not be repeated herein.

Using 65 reflecting plates and 64 wavelength shifting fibers for the vertical axis, and using 65 reflecting plates and 64 wavelength shifting fibers for the horizontal axis, a two-dimensional heavy particle beam image detector with 64 channels for the vertical axis and 64 channels for the horizontal axis, and with a large sensitive area with 320 mm×320 mm dimension for the heavy particle beam may be obtained.
(Embodiment 11)

Figure 11:
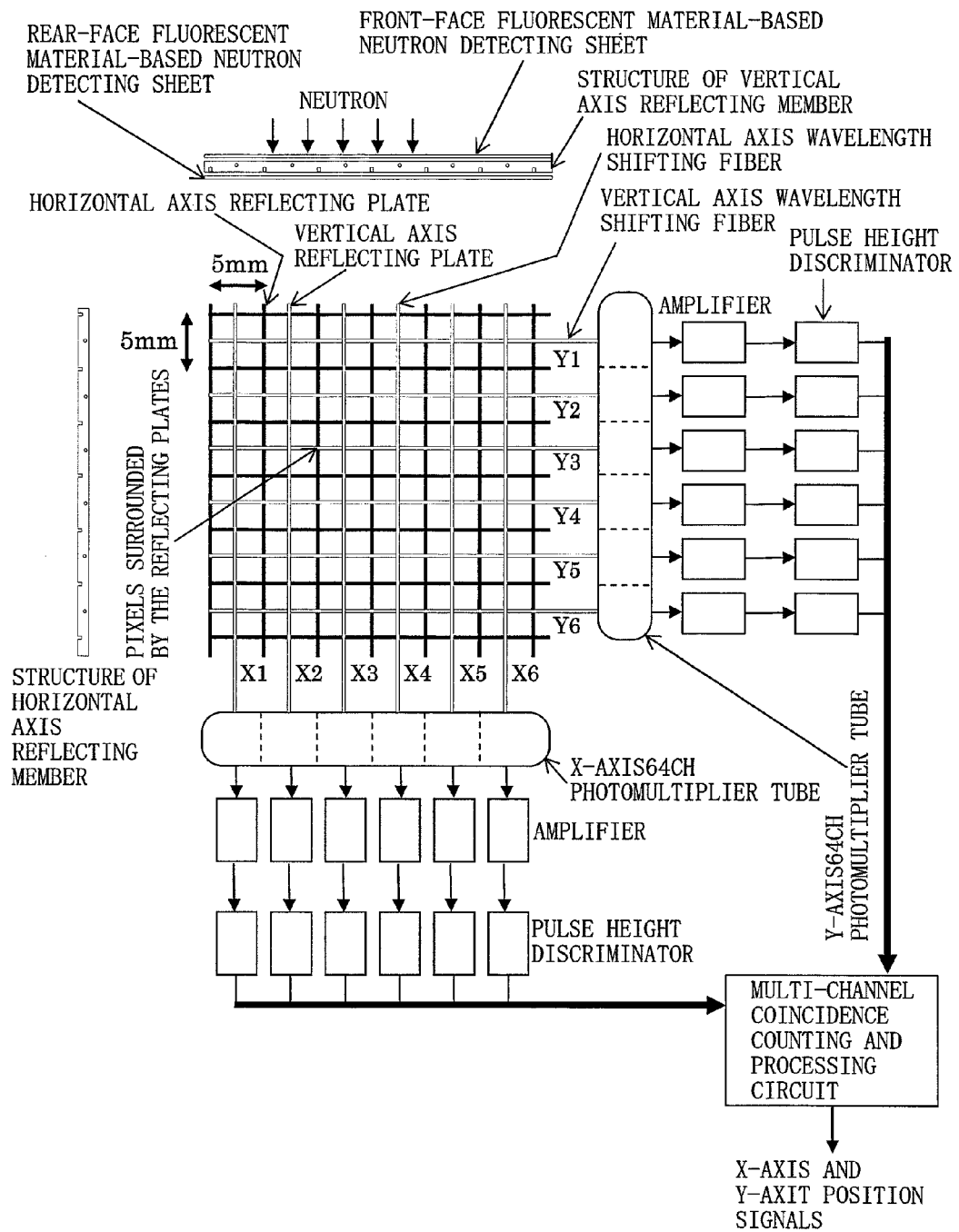
FIG. 11 illustrates a structure of the pixel-type two-dimensional image detector using neutron detecting medium according to another embodiment of the present invention.

As Embodiment 11, referring to the embodiment 2 of the structure of the pixel-type two-dimensional image detector according to the present invention using the neutron detecting medium, the two-dimensional neutron image detector according to the present invention is described below by referring to FIG. 11.

In this embodiment, a neutron detecting sheet commercially available from AST in England (containing ZnS:Ag and $^6$LiF with a mixing ratio of 4:1) is used, which was manufactured by using ZnS:Ag as the neutron detecting medium, which may be formed by ZnS:Ag as a fluorescent material, and mixing them with binder material. The thickness of the detecting sheet is 0.45 mm. In this embodiment, a couple of neutron detection sheets are used at both of the front face and the rear face of the lattice-like fluorescent light material.

In case that the wavelength shifting fiber for vertical axis in the lattice-like fluorescent light detecting member, which will be described later, disposed behind the fluorescent material-based neutron detecting sheet is configured to contact firmly to this detecting sheet, the fluorescent light emitted from the detecting sheet close to this firmly contact portion may be absorbed by the wavelength shifting fiber for vertical axis and the fraction of the fluorescent light directly detected by the wavelength shifting fiber for horizontal axis disposed below may become significantly low. In order to remedy this defect, it is required to keep a distance between the fluorescent material-based neutron detecting sheet and the wavelength shifting fiber for vertical axis. In case of attempting to realize this structure in Embodiment 1, the fluorescent light may leak out to the neighboring pixels because a clearance gap resulted from the distance kept as described above is formed at the reflecting plate.

BCF-92MC commercially available from Saint-Gobain K.K., that is sensitive to the fluorescent light having the wavelength from 350 nm to 440 nm and transforms the wavelength of the fluorescent light into 490 nm, is used as the wavelength shirting fiber. The wavelength shifting fiber may be shaped in a circular form with 1 mm diameter.

In order to remedy the above described defect, in this embodiment, in the lattice-like structure in which a series of vertical axis reflecting plates and a series of horizontal axis reflecting plates are formed, the structure is so provided that an individual hole may be formed at the upper half positions on the reflecting plate arranged in the vertical axis direction and at the center position on the vertical axis interval, that is, at the position corresponding to 2.5 mm in this embodiment, so as to accommodate a single wavelength shifting fiber for vertical axis detection for detecting the fluorescent light. As shown in FIG. 11, the hole may be shaped in a circular form with 1.1 mm diameter and with a center position being shifted 1 mm from the upper part of the reflecting part so as to prevent the fluorescent light from leaking out to the neighboring pixels. Owing to such structure, it will be appreciated that an interval of 0.5 mm may be provided between the fluorescent material-based heavy particle beam detecting sheet and the surface of the wavelength shifting fiber for vertical axis, which can remedy the above described defect.

Similarly, the structure is so provided that an individual hole may be formed at the upper half positions on the reflecting plate arranged in the vertical axis direction and at the center position on the vertical axis interval, that is, at the position corresponding to 2.5 mm in this embodiment, so as to accommodate a single wavelength shifting fiber for vertical axis detection for detecting the fluorescent light. As shown in FIG. 11, the hole may be shaped in a circular form with 1.1 mm diameter and with a center position being shifted 1 mm from the upper part of the reflecting part so as to prevent the fluorescent light from leaking out to the neighboring pixels. Owing to such structure, it will be appreciated that an interval of 0.5 mm may be provided between the neutron detecting sheet disposed at the bottom part and the surface of the wavelength shifting fiber for horizontal axis, which can prevent the light condensing ratio from decreasing by means of firm contact between the neutron detecting sheet and the surface of the wavelength shifting fiber for horizontal axis.

The usage method and related descriptions of the lattice-like fluorescent light detecting member so formed as described above are the same as Embodiment 2, which will not be repeated herein.

Using 65 reflecting plates and 64 wavelength shifting fibers for the vertical axis, and using 65 reflecting plates and 64 wavelength shifting fibers for the horizontal axis, a two-dimensional neutron image detector with 64 channels for the vertical axis and 64 channels for the horizontal axis, and with a large sensitive area with 320 mm×320 mm dimension for neutron may be obtained.
(Embodiment 12)

Figure 12:
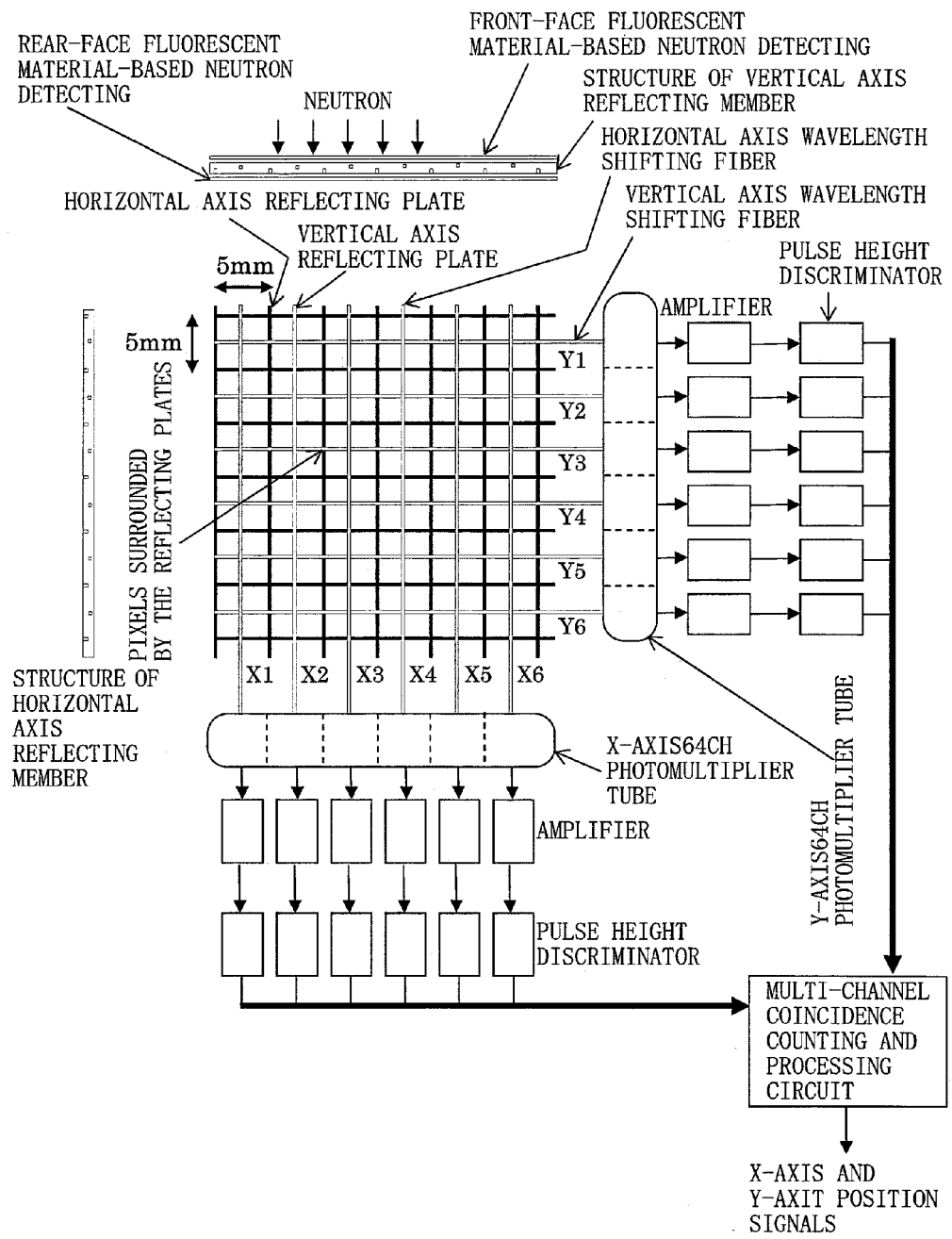
FIG. 12 illustrates a structure of the pixel-type two-dimensional image detector using neutron detecting medium according to another embodiment of the present invention.
Figure 13:
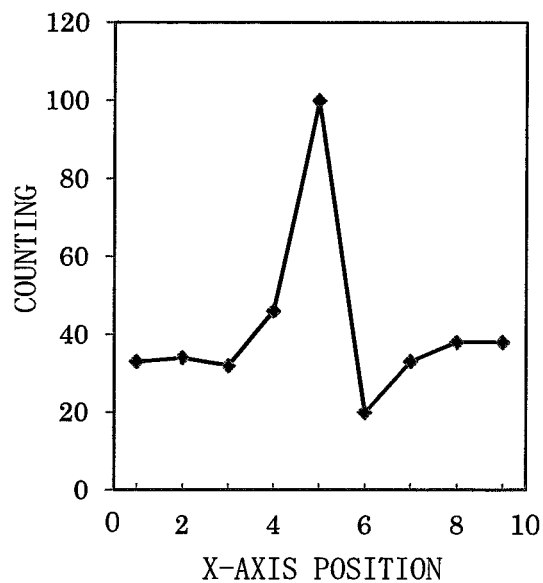
FIG. 13(A) and FIG. 13(B) illustrates an influence of the fluorescent light over the surrounding pixels in the two-dimensional neutron image detector.
Figure 13:
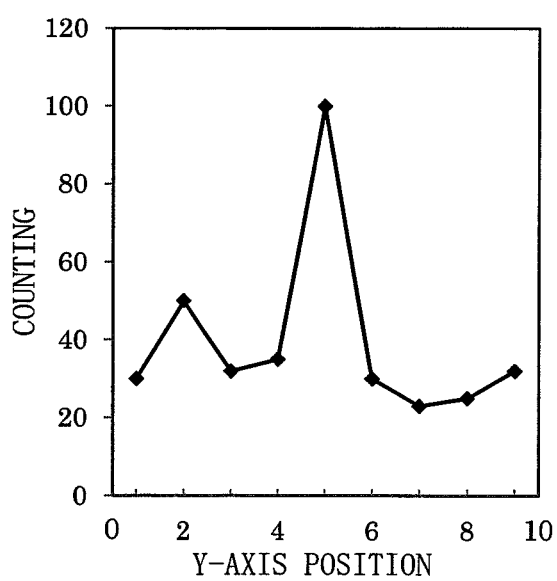

As Embodiment 12, referring to FIG. 12, the pixel-type two-dimensional image detector using neutron detecting medium according to the present invention is described below.

In this embodiment, a neutron detecting sheet commercially available from AST in England (containing ZnS:Ag and $^6$LiF with a mixing ratio of 4:1) is used, which was manufactured by using ZnS:Ag as the neutron detecting medium, which may be formed by ZnS:Ag as a fluorescent material, and mixing them with binder material. The thickness of the detecting sheet is 0.45 mm. In this embodiment, a couple of neutron detection sheets are used at both of the front face and the rear face of the lattice-like fluorescent light material.

In case that the wavelength shifting fiber for vertical axis in the lattice-like fluorescent light detecting member, which will be described later, disposed behind the fluorescent material-based neutron detecting sheet is configured to contact firmly to this detecting sheet, the fluorescent light emitted from the detecting sheet close to this firmly contact portion may be absorbed by the wavelength shifting fiber for vertical axis and the fraction of the fluorescent light directly detected by the wavelength shifting fiber for horizontal axis disposed below may become significantly low. In order to remedy this defect, it is required to keep a distance between the fluorescent material-based neutron detecting sheet and the wavelength shifting fiber for vertical axis. In case of attempting to realize this structure in Embodiment 1, the fluorescent light may leak out to the neighboring pixels because a clearance gap resulted from the distance kept as described above is formed at the reflecting plate.

BCF-92MC commercially available from Saint-Gobain K.K., that is sensitive to the fluorescent light having the wavelength from 350 nm to 440 nm and transforms the wavelength of the fluorescent light into 490 nm, is used as the wavelength shirting fiber. The wavelength shifting fiber may be shaped in a square form with 1 mm edge.

In order to improve the above described defect, in this embodiment, in the lattice-like structure in which a series of vertical axis reflecting plates and a series of horizontal axis reflecting plates are formed, the structure is so provided that an individual hole may be formed at the upper half positions on the reflecting plate arranged in the vertical axis direction and at the center position on the vertical axis interval, that is, at the position corresponding to 2.5 mm in this embodiment, so as to accommodate a single wavelength shifting fiber for vertical axis detection for detecting the fluorescent light. As shown in FIG. 11, the hole may be shaped in a square form with 1.1 mm edge and with a center position being shifted 1 mm from the upper part of the reflecting part so as to prevent the fluorescent light from leaking out to the neighboring pixels. Owing to such structure, it will be appreciated that an interval of 0.5 mm may be provided between the fluorescent material-based neutron detecting sheet and the surface of the wavelength shifting fiber for vertical axis, which can remedy the above described defect.

Similarly, the structure is so provided that an individual hole may be formed at the upper half positions on the reflecting plate arranged in the horizontal axis direction and at the center position on the horizontal axis interval, that is, at the position corresponding to 2.5 mm in this embodiment, so as to accommodate a single wavelength shifting fiber for horizontal axis detection for detecting the fluorescent light. As shown in FIG. 12, the hole may be shaped in a square form with 1.1 mm edge and with a center position being shifted 1 mm from the upper part of the reflecting plate so as to prevent the fluorescent light from leaking out to the neighboring pixels. Owing to such structure, it will be appreciated that an interval of 0.5 mm may be provided between the fluorescent light reflecting bottom plate disposed at the bottom part and the surface of the wavelength shifting fiber for horizontal axis, which can prevent the light condensing ratio from decreasing by means of firm contact between the neutron detecting sheet and the surface of the wavelength shifting fiber for horizontal axis.

The usage method and related descriptions of the lattice-like fluorescent light detecting member so formed as described above are the same as Embodiment 1, which will not be repeated herein.

Using 65 reflecting plates and 64 wavelength shifting fibers for the vertical axis, and using 65 reflecting plates and 64 wavelength shifting fibers for the horizontal axis, a two-dimensional neutron image detector with 64 channels for the vertical axis and 64 channels for the horizontal axis, and with a large sensitive area with 320 mm×320 mm dimension for neutron may be obtained.

In the above embodiments, two-dimensional image detectors with a relatively simplified structure having a small number of wavelength shifting fibers have been described in order to provide a better understanding of the present invention, though it will be appreciated that the detection sensitivity may be increased by making larger the number of wavelength shifting fibers to be displaced per pixel in comparison with the number disclosed in the above embodiments.

Though the above embodiments refer to the structure in which a couple of wavelength shifting fibers are disposed per one pixel in the above embodiments, it will be appreciated that further large-area two-dimensional image detector can be realized also with additional overall cost reduction in the two-dimensional image detector by means that three or more wavelength shifting fibers are disposed per one pixel and a photomultiplier tube is connected. For example, in case of using three wavelength shifting fibers, the first and third wavelength shifting fibers may be connected the photomultiplier tube 1, and the second wavelength shifting fiber may be connected the photomultiplier tube 2. Alternately, for example, in case of using four wavelength shifting fibers, the first and third wavelength shifting fibers may be connected to the photomultiplier tube 1, and the second and forth wavelength shifting fibers may be connected to the photomultiplier tube 2. In case of using 5 or more wavelength shifting fibers, the similar configuration may be available.

What is claimed is:
1. A pixel-type two-dimensional image detector wherein
in a lattice-like pixel structure in which a reflecting plate that reflects a fluorescent light from a fluorescent material-based heavy particle beam detecting sheet emitting a fluorescent light in response to an incident of a heavy particle beam is arranged along a vertical axis at a regular interval, and a reflecting plate that reflects a fluorescent light is arranged along a horizontal axis at a regular interval and at a right angle with respect to a series of fluorescent plates formed arranged along the vertical axis,
a lattice-like fluorescent light detecting member is formed by providing such a structure that a groove may be formed at upper half position or lower half position of the reflecting plate arranged in a vertical axis direction and at a center position in a vertical axis interval for accommodating a single wavelength shifting fiber for vertical axis detection for detecting the fluorescent light, and providing such a structure that a groove may be formed at upper half position or lower half position of the reflecting plate arranged in a horizontal axis direction and at a center position in a horizontal axis interval for accommodating a single wavelength shifting fiber for horizontal axis detection for detecting the fluorescent, and said fluorescent material-based particle beam detecting sheet for emitting the fluorescent light in response to an incident of the heavy particle beam is arranged only at a front surface or at both of a front surface and a back surface of the lattice-like fluorescent light detecting member, wherein a fluorescent light with its wavelength converted by and emitted from the wavelength shifting fiber for vertical axis detection and the wavelength shifting fiber for horizontal axis detection is detected respectively by a photodetector to obtain a vertical axis pulse signal and a horizontal axis pulse signal; and an incident position of the heavy particle beam is determined by applying a coincidence count measurement to the vertical axis pulse signal and the horizontal axis pulse signal.

2. A pixel-type two-dimensional image detector according to claim 1 wherein, in case that the wavelength shifting fiber is shaped in a circular form, a circular hole is formed in stead of said groove at an upper half position or lower half position of the reflecting plate arranged in the vertical direction and at an upper half position or lower half position of the reflecting plate arranged in the horizontal direction.

3. A pixel-type two-dimensional image detector according to claim 1 wherein, in case that the wavelength shifting fiber is shaped in a square form, instead of said groove, a square hole is formed at an upper half position or lower half position of the reflecting plate arranged in the vertical direction, and a square hole is formed at an upper half position or lower half position of the reflecting plate arranged in the horizontal direction.

4. A pixel-type two-dimensional image detector wherein in a lattice-like pixel structure in which a reflecting plate that reflects a fluorescent light from a fluorescent material-based neutron detecting sheet formed by mixing a material including any one or both of $^6$Li element and $^{10}$B element as a neutron converter with a fluorescent material emitting a fluorescent light in response to an incident of a heavy particle beam is arranged along a vertical axis at a regular interval, and a reflecting plate that reflects a fluorescent light is arranged along a horizontal axis at a regular interval and at a right angle with respect to a series of fluorescent plates formed arranged along the vertical axis, a lattice-like fluorescent light detecting member is formed by providing such a structure that a groove may be formed at upper half position or lower half position of the reflecting plate arranged in a vertical axis direction and at a center position in a vertical axis interval for accommodating a single wavelength shifting fiber for vertical axis detection for detecting the fluorescent light, and providing such a structure that a groove may be formed at upper half position or lower half position of the reflecting plate arranged in a horizontal axis direction and at a center position in a horizontal axis interval for accommodating a single wavelength shifting fiber for horizontal axis detection for detecting the fluorescent, and said fluorescent material-based particle beam detecting sheet for emitting the fluorescent light in response to an incident of the neutron is arranged only at a front surface or at both of a front surface and a back surface of the lattice-like fluorescent light detecting member, wherein a fluorescent light with its wavelength converted by and emitted from the wavelength shifting fiber for vertical axis detection and the wavelength shifting fibers for horizontal axis detection is detected respectively by a photodetector to obtain a vertical axis pulse signal and a horizontal axis pulse signal; and an incident position of the neutron is determined by applying a coincidence count measurement to the vertical axis pulse signal and the horizontal axis pulse signal.

5. A pixel-type two-dimensional image detector wherein in a lattice-like pixel structure in which a reflecting plate that reflects a fluorescent light from a fluorescent material-based heavy particle beam detecting sheet emitting a fluorescent light in response to an incident of a heavy particle beam is arranged along a vertical axis at a regular interval, and a reflecting plate that reflects a fluorescent light is arranged along a horizontal axis at a regular interval and at a right angle with respect to a series of fluorescent plates formed arranged along the vertical axis, a lattice-like fluorescent light detecting member is formed by providing such a structure that a groove may be formed at upper half position or lower half position of the reflecting plate arranged in a vertical axis direction and at a couple of positions that cut a vertical interval into three equal parts for accommodating a couple of wavelength shifting fibers for vertical axis detection for detecting the fluorescent light, and providing such a structure that a groove may be formed at upper half position or lower half position of the reflecting plate arranged in a horizontal axis direction and at a couple of positions that cut a horizontal interval into three equal parts for accommodating a couple of wavelength shifting fibers for horizontal axis detection for detecting the fluorescent, and said fluorescent material-based particle beam detecting sheet for emitting the fluorescent light in response to an incident of the heavy particle beam is arranged only at a front surface or at both of a front surface and a back surface of the lattice-like fluorescent light detecting member, wherein a fluorescent light with its wavelength converted by and emitted from two or more wavelength shifting fibers for vertical axis detection and two or more wavelength shifting fibers for horizontal axis detection is detected respectively by a photodetector to obtain a vertical axis pulse signal and a horizontal axis pulse signal; and an incident position of the heavy particle beam is determined by applying a coincidence count measurement to the vertical axis pulse signal and the horizontal axis pulse signal.

6. A pixel-type two-dimensional image detector wherein in a lattice-like pixel structure in which a reflecting plate that reflects a fluorescent light from a fluorescent material-based neutron detecting sheet formed by mixing a material including any one or both of $^6$Li element and $^{10}$B element as a neutron converter with a fluorescent material emitting a fluorescent light in response to an incident of a heavy particle beam is arranged along a vertical axis at a regular interval, and a reflecting plate that reflects a fluorescent light is arranged along a horizontal axis at a regular interval and at a right angle with respect to a series of fluorescent plates formed arranged along the vertical axis, a lattice-like fluorescent light detecting member is formed by providing such a structure that a groove may be formed at upper half position or lower half position of the reflecting plate arranged in a vertical axis direction and at a couple of positions that cut a vertical interval into three equal parts for accommodating a couple of wavelength shifting fibers for vertical axis detection for detecting the fluorescent light, and providing such a structure that a groove may be formed at upper half position or lower half position of the reflecting plate arranged in a horizontal axis direction and at a couple of positions that cut a vertical interval into three equal parts for accommodating a couple of wavelength shifting fibers for horizontal axis detection for detecting the fluorescent, and said fluorescent material-based particle beam detecting sheet for emitting the fluorescent light in response to an incident of the neutron is arranged only at a front surface or at both of a front surface and a back surface of the lattice-like fluorescent light detecting member, wherein a fluorescent light with its wavelength converted by and emitted from two or more wavelength shifting fibers for vertical axis detection and two or more wavelength shifting fibers for horizontal axis detection is detected respectively by a photodetector to obtain a vertical axis pulse signal and a horizontal axis pulse signal; and an incident position of the neutron is determined by applying a coincidence count measurement to the vertical axis pulse signal and the horizontal axis pulse signal.

7. A pixel-type two-dimensional image detector wherein in a lattice-like pixel structure in which a reflecting plate that reflects a fluorescent light from a fluorescent material-based heavy particle beam detecting sheet using ZnS:Ag as a fluorescent material emitting a fluorescent light in response to an incident of a heavy particle beam is arranged along a vertical axis at a regular interval, and a reflecting plate that reflects a fluorescent light is arranged along a horizontal axis at a regular interval and at a right angle with respect to a series of fluorescent plates formed arranged along the vertical axis, a lattice-like fluorescent light detecting member is formed by providing such a structure that a groove may be formed at upper half position or lower half position of the reflecting plate arranged in a vertical axis direction and at a couple of positions that cut a vertical interval into three equal parts for accommodating a couple of wavelength shifting fibers for vertical axis detection for detecting the fluorescent light, and providing such a structure that a groove may be formed at upper half position or lower half position of the reflecting plate arranged in a horizontal axis direction and at a couple of positions that cut a horizontal interval into three equal parts for accommodating a couple of wavelength shifting fibers for horizontal axis detection for detecting the fluorescent, and said fluorescent material-based particle beam detecting sheet for emitting the fluorescent light in response to an incident of the heavy particle beam is arranged only at a front surface or at both of a front surface and a back surface of the lattice-like fluorescent light detecting member, wherein fluorescent lights from two or more wavelength shifting fibers for vertical axis detection are detected respectively as a couple of pulse signals by a couple of photodetectors, and a coincidence count measurement is performed to obtain a vertical axis pulse signal if coincidence of a couple of pulse signals is detected; fluorescent lights from two or more wavelength shifting fibers for horizontal axis detection are detected respectively as a couple of pulse signals by a couple of photodetectors, and a coincidence count measurement is performed to obtain a horizontal axis pulse signal if coincidence of a couple of pulse signals is detected; and an incident position of the heavy particle beam is determined by applying a coincidence count measurement to the vertical axis pulse signal and the horizontal axis pulse signal.

8. A pixel-type two-dimensional image detector wherein in a lattice-like pixel structure in which a reflecting plate that reflects a fluorescent light from a fluorescent material-based neutron detecting sheet formed by mixing a material including any one or both of $^6$Li element and $^{10}$B element as a neutron converter with a fluorescent material emitting a fluorescent light in response to an incident of a heavy particle beam is arranged along a vertical axis at a regular interval, and a reflecting plate that reflects a fluorescent light is arranged along a horizontal axis at a regular interval and at a right angle with respect to a series of fluorescent plates formed arranged along the vertical axis, a lattice-like fluorescent light detecting member is formed by providing such a structure that a groove may be formed at upper half position or lower half position of the reflecting plate arranged in a vertical axis direction and at a couple of positions that cut a vertical interval into three equal parts for accommodating a couple of wavelength shifting fibers for vertical axis detection for detecting the fluorescent light, and providing such a structure that a groove may be formed at upper half position or lower half position of the reflecting plate arranged in a horizontal axis direction and at a couple of positions that cut a vertical interval into three equal parts for accommodating a couple of wavelength shifting fibers for horizontal axis detection for detecting the fluorescent, and said fluorescent material-based particle beam detecting sheet for emitting the fluorescent light in response to an incident of the neutron is arranged only at a front surface or at both of a front surface and a back surface of the lattice-like fluorescent light detecting member, wherein fluorescent lights from two or more wavelength shifting fibers for vertical axis detection are detected respectively as a couple of pulse signals by a couple of photodetectors, and a coincidence count measurement is performed to obtain a vertical axis pulse signal if coincidence of a couple of pulse signals is detected; fluorescent lights from two or more wavelength shifting fibers for horizontal axis detection are detected respectively as a couple of pulse signals by a couple of photodetectors, and a coincidence count measurement is performed to obtain a horizontal axis pulse signal if coincidence of a couple of pulse signals is detected; and an incident position of the neutron is determined by applying a coincidence count measurement to the vertical axis pulse signal and the horizontal axis pulse signal.

9. A pixel-type two-dimensional image detector wherein in a lattice-like pixel structure in which a reflecting plate that reflects a fluorescent light from a fluorescent material-based heavy particle beam detecting sheet emitting a fluorescent light in response to an incident of a heavy particle beam is arranged along a vertical axis at a regular interval, and a reflecting plate that reflects a fluorescent light is arranged along a horizontal axis at a regular interval and at a right angle with respect to a series of fluorescent plates formed arranged along the vertical axis, a lattice-like fluorescent light detecting member is formed by providing such a structure that a groove may be formed at upper half position or lower half position of the reflecting plate arranged in a vertical axis direction and at a center position in a vertical axis interval for accommodating a single wavelength shifting fiber for vertical axis detection for detecting the fluorescent light, and providing such a structure that a groove may be formed at upper half position or lower half position of the reflecting plate arranged in a horizontal axis direction and at a center position in a horizontal axis interval for accommodating a single wavelength shifting fiber for horizontal axis detection for detecting the fluorescent, and said fluorescent material-based particle beam detecting sheet for emitting the fluorescent light in response to an incident of the heavy particle beam is arranged only at a front surface or at both of a front surface and a back surface of the lattice-like fluorescent light detecting member, wherein fluorescent lights with its wavelength converted by and emitted from both end faces of the wavelength shifting fibers for vertical axis detection are detected respectively as a couple of pulse signals by a couple of photodetectors, and a coincidence count measurement is performed to obtain a vertical axis pulse signal if coincidence of a couple of pulse signals is detected; fluorescent lights with its wavelength converted by and emitted from both end faces of the wavelength shifting fibers for horizontal axis detection are detected respectively as a couple of pulse signals by a couple of photodetectors, and a coincidence count measurement is performed to obtain a horizontal axis pulse signal if coincidence of a couple of pulse signals is detected; and an incident position of the heavy particle beam is determined by applying a coincidence count measurement to the vertical axis pulse signal and the horizontal axis pulse signal.

10. A pixel-type two-dimensional image detector wherein in a lattice-like pixel structure in which a reflecting plate that reflects a fluorescent light from a fluorescent material-based neutron detecting sheet formed by mixing a material including any one or both of $^6$Li element and $^{10}$B element as a neutron converter with a fluorescent material emitting a fluorescent light in response to an incident of a heavy particle beam is arranged along a vertical axis at a regular interval, and a reflecting plate that reflects a fluorescent light is arranged along a horizontal axis at a regular interval and at a right angle with respect to a series of fluorescent plates formed arranged along the vertical axis, a lattice-like fluorescent light detecting member is formed by providing such a structure that a groove may be formed at upper half position or lower half position of the reflecting plate arranged in a vertical axis direction and at a center position in a vertical axis interval for accommodating a single wavelength shifting fiber for vertical axis detection for detecting the fluorescent light, and providing such a structure that a groove may be formed at upper half position or lower half position of the reflecting plate arranged in a horizontal axis direction and at a center position in a horizontal axis interval for accommodating a single wavelength shifting fiber for horizontal axis detection for detecting the fluorescent, and said fluorescent material-based particle beam detecting sheet for emitting the fluorescent light in response to an incident of the neutron is arranged only at a front surface or at both of a front surface and a back surface of the lattice-like fluorescent light detecting member, wherein fluorescent lights with its wavelength converted by and emitted from both end faces of the wavelength shifting fibers for vertical axis detection are detected respectively as a couple of pulse signals by a couple of photodetectors, and a coincidence count measurement is performed to obtain a vertical axis pulse signal if coincidence of a couple of pulse signals is detected; fluorescent lights with its wavelength converted by and emitted from both end faces of the wavelength shifting fibers for horizontal axis detection are detected respectively as a couple of pulse signals by a couple of photodetectors, and a coincidence count measurement is performed to obtain a horizontal axis pulse signal if coincidence of a couple of pulse signals is detected; and an incident position of the neutron is determined by applying a coincidence count measurement to the vertical axis pulse signal and the horizontal axis pulse signal.

* * * * *